(12) United States Patent
Kurata

(10) Patent No.: US 12,614,162 B2
(45) Date of Patent: Apr. 28, 2026

(54) COMMODITY REGISTRATION APPARATUS AND MONITORING APPARATUS

(71) Applicant: Toshiba Tec Kabushiki Kaisha, Tokyo (JP)

(72) Inventor: Masachika Kurata, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 122 days.

(21) Appl. No.: 18/364,294

(22) Filed: Aug. 2, 2023

(65) Prior Publication Data

US 2024/0104535 A1     Mar. 28, 2024

(30) Foreign Application Priority Data

Sep. 26, 2022    (JP) .................................. 2022-152928

(51) Int. Cl.
*G06Q 20/18*          (2012.01)
*G06Q 20/20*          (2012.01)
(Continued)

(52) U.S. Cl.
CPC ............. *G06Q 20/18* (2013.01); *G06Q 20/20* (2013.01); *G06V 20/49* (2022.01); *G06V 20/52* (2022.01)

(58) Field of Classification Search
CPC ........ G06Q 20/18; G06Q 20/20; G06Q 50/18; G06Q 50/184; G06Q 50/26; G06Q 20/208;
(Continued)

(56) References Cited

U.S. PATENT DOCUMENTS

| | | | | |
|---|---|---|---|---|
| 10,810,461 | B2 * | 10/2020 | Sugiura | ................ G06V 40/172 |
| 2017/0178140 | A1 * | 6/2017 | Kawamoto | .......... G06Q 20/102 |
| 2020/0134706 | A1 | 4/2020 | Mori | |

FOREIGN PATENT DOCUMENTS

| | | |
|---|---|---|
| CN | 111105573 A | 5/2020 |
| CN | 113034793 A | 6/2021 |

(Continued)

OTHER PUBLICATIONS

Japanese Office Action dated Oct. 14, 2025, mailed in counterpart Japanese Application No. 2022-152928, 10 pages.
(Continued)

*Primary Examiner* — Garcia Ade
(74) *Attorney, Agent, or Firm* — Kim & Stewart LLP

(57) ABSTRACT

According to one embodiment, a commodity registration apparatus includes an input device that can be operated by a customer himself or herself to input information related to a sales transaction in which the customer purchases a commodity. The apparatus also has a processor and a display device to display information to the customer who operates the input device. The processor is configured to cause the display device to display a consent confirmation screen for obtaining consent from the customer to an additional use of a video from a camera monitoring the customer during the sales transaction including the operation of the input device by the customer. The processor is also configured to perform registration processing for the commodity to be purchased based on information from the input device. The consent confirmation screen is displayed before the processor performs the registration processing.

10 Claims, 14 Drawing Sheets

(51) Int. Cl.
    *G06V 20/40*      (2022.01)
    *G06V 20/52*      (2022.01)

(58) Field of Classification Search
    CPC ........ G06V 20/49; G06V 20/52; G06N 3/044;
              G06N 3/0464; G06N 3/08; G06N 20/00;
                 G07F 7/088; G07G 1/0009; G07G
              1/0036; G07G 1/0045; G07G 1/0054;
             G07G 1/01; G07G 3/003; G07G 1/0063
    See application file for complete search history.

(56)                     References Cited

FOREIGN PATENT DOCUMENTS

| | | | |
|---|---|---|---|
| JP | 2014203100 A | 10/2014 |
| JP | 7039084 B1 | 3/2022 |
| WO | 2018142764 A1 | 8/2018 |

OTHER PUBLICATIONS

Chinese Office Action dated Feb. 28, 2026, mailed in counterpart Chinese Application No. 202310662199.3, 27 pages.

* cited by examiner

*FIG. 5*

| |
|---|
| SEGMENTATION START DATE AND TIME |
| SEGMENTATION END DATE AND TIME |
| CONSENT FLAG |
| LEARNING FLAG |

Figure 6:
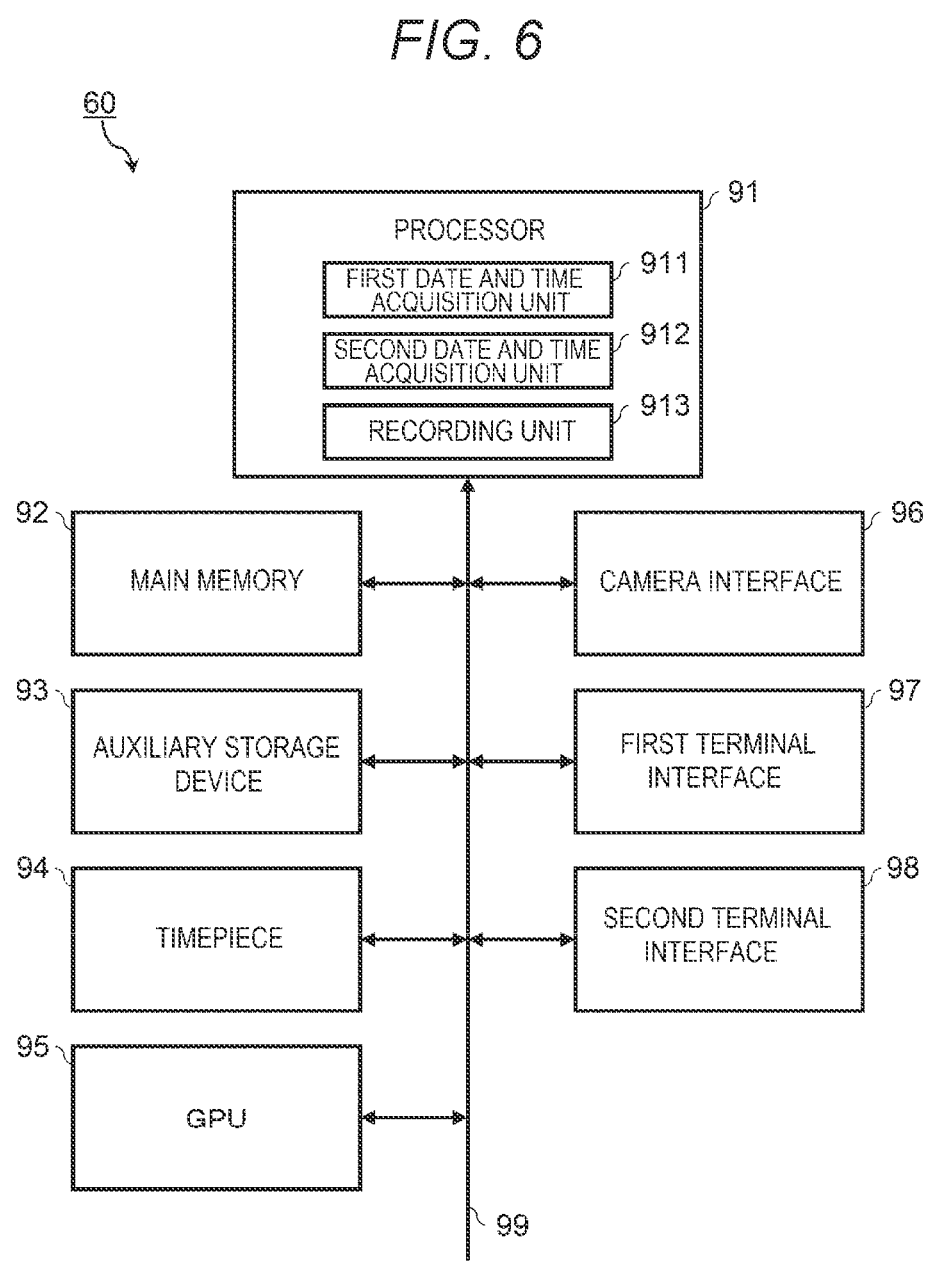

PROCESSOR — 91

FIRST DATE AND TIME ACQUISITION UNIT — 911

SECOND DATE AND TIME ACQUISITION UNIT — 912

RECORDING UNIT — 913

92 — MAIN MEMORY

96 — CAMERA INTERFACE

93 — AUXILIARY STORAGE DEVICE

97 — FIRST TERMINAL INTERFACE

94 — TIMEPIECE

98 — SECOND TERMINAL INTERFACE

95 — GPU

| MEMBER CODE |
| --- |
| MEMBER INFORMATION |
| MEMBER CONSENT FLAG |
| CONFIRMATION UNNECESSITY FLAG |

221

COMMODITY REGISTRATION APPARATUS AND MONITORING APPARATUS

CROSS-REFERENCE TO RELATED APPLICATION

This application is based upon and claims the benefit of priority from Japanese Patent Application No. 2022-152928, filed Sep. 26, 2022, the entire contents of which are incorporated herein by reference.

FIELD

Embodiments described herein relate generally to a commodity registration system and apparatuses and associated methods for such apparatuses such as a monitoring apparatus and a commodity registration apparatus.

BACKGROUND

In recent years, in a retail store such as a supermarket, a self-service POS (Point Of Sales) terminal has been attracting attention from the viewpoints of a reduction in personnel expenses, improved infection control, and the like. The self-service POS terminal is a commodity registration apparatus adapted for a full self-service system in which a customer performs operation from product registration to settlement (making payment) of the purchased products by himself or herself without intervention from a store clerk or the like. However, since a store clerk is not directly involved in the transaction, a monitoring apparatus that monitors actions of the customer operating the self-service POS terminal to identify fraudulent acts by hand movements or the like of the customer detected in a video feed from a camera has been implemented in such systems.

In such a monitoring apparatus that uses a camera video, machine learning performed using a DNN (Deep Neural Network), a CNN (Convolutional Neural Network), an RNN (Recurrent Neural Network), or the like has been used as a technique for recognizing a fraudulent act of a customer. By using the machine learning, it is possible to identify a fraudulent act in an extremely short time. However, in order to improve recognition accuracy of the machine learning, it is necessary to improve accuracy of a machine learning model of a mechanism for deriving a result with respect to input data. In order to improve the accuracy of the machine learning model, it is necessary to cause the monitoring apparatus to learn the machine learning model using videos of many purchasers (customers) imaged by the camera.

However, in order to use a video of a purchaser obtained for an original purpose of finding of a fraudulent act for a different purpose from the original purpose, such as improving the accuracy of a machine learning model or the like, it may be necessary, from the viewpoint of personal information protection laws, to somehow notify the purchasers depicted in such video of the potential new use of the video and obtain consent of the purchaser for such new user.

BRIEF DESCRIPTION OF THE DRAWINGS

FIG. 5 is a schematic diagram illustrating a structure of segmentation data stored in a segmentation information file.

FIG. 6 is a block diagram of certain aspects of a monitoring apparatus.

FIG. 7 is a flowchart of information processing executed by a processor of a self-service POS terminal.

DETAILED DESCRIPTION

An object of embodiments is to provide a commodity registration apparatus that can obtain consent from a purchaser (store customer) who performs a checkout operation for a purchase of a commodity such that a video of the purchaser performing a checkout out operation may be used for other purposes beyond just the operation monitoring of the specific checkout operation.

According to one embodiment, a commodity registration apparatus includes an input device that can be operated by a customer himself or herself to input information related to a sales transaction in which the customer purchases a commodity, a display device configured to display information to the customer who operates the input device, and a processor. The processor is configured to cause the display device to display a consent confirmation screen for obtaining consent from the customer to an additional use of a video from a camera monitoring the customer during the sales transaction including the operation of the input device by the customer and to perform registration processing for the commodity to be purchased by the customer based on information from the input device. The consent confirmation screen is displayed before the processor performs the registration processing.

A checkout system of an embodiment including a commodity registration apparatus that can obtain consent of a purchaser who performs checkout for a purchased commodity to use of a video of the checkout is explained with reference to the drawings. Additionally, a monitoring apparatus that monitors self-checkout operations for the presence or absence of a fraudulent act of a purchaser operating a commodity registration apparatus is explained with reference to the drawings.

First Embodiment

A first embodiment is explained with reference to FIGS. 1 to 10.

Explanation of a Checkout System

Figure 1:
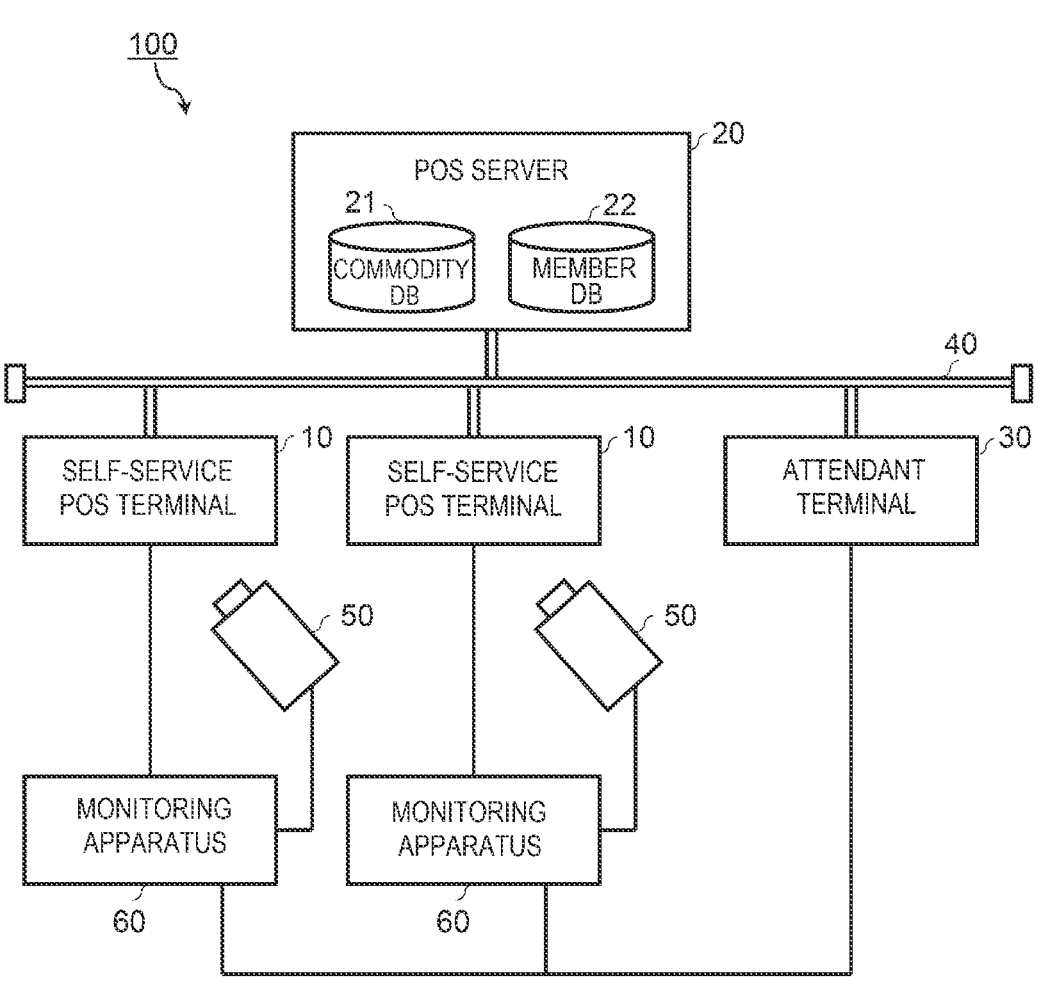
FIG. 1 is a schematic configuration diagram illustrating a checkout system according to an embodiment.

FIG. 1 is a schematic configuration diagram illustrating a checkout system 100 according to an embodiment. The checkout system 100 includes a plurality of self-service POS terminals 10, a POS server 20, and an attendant terminal 30. In the checkout system 100, the self-service POS terminals 10, the POS server 20, and the attendant terminal 30 are connected by a communication network 40 such as a LAN (Local Area Network).

The self-service POS terminals 10 are installed in a checkout place of a store. Customers, that is, purchasers who finished shopping become operators of the self-service POS terminals 10. A purchaser who puts commodities to be purchased in a shopping basket or a shopping cart and moves to the checkout place to operate a self-service POS terminal 10 and perform a self checkout for the commodities to be purchased. This example, performance of a self checkout (checkout) includes registration of the commodities and a settlement operation for the purchased commodities by himself or herself. The self-service POS terminal 10 is an example of a commodity registration apparatus adapted to full self-service. The commodity registration apparatus can also be referred to as commodity registration terminal, settlement apparatus, settlement terminal, checkout apparatus, checkout terminal, or the like.

The POS server 20 provides various services relating to the checkout system 100 to the self-service POS terminals 10 and the attendant terminal 30 connected to the POS server 20 by the communication network 40. For example, the POS server 20 manages a commodity database 21. The commodity database 21 is an aggregate of commodity records created for each of the commodities sold in the store. The commodity records each include data such as a commodity code, a commodity name, and a price. The commodity code is a unique code set for each of the commodities in order to individually identify the commodities. Barcodes representing commodity codes are attached to the commodities. The commodity name and the price are a specific name of the commodity identified by the commodity code and a sales amount per one article of the commodity. If a commodity code is input to the self-service POS terminal 10, the POS server 20 searches through the commodity database 21 and provides data such as a commodity name and a price of a commodity record corresponding to the commodity code to the self-service POS terminal 10.

For example, the POS server 20 manages a member database 22. The member database 22 is an aggregate of member records created for customers who are members of the store (members of a store loyalty program or the like). The member records include a member code and member information. The member code is a unique code set for each member in order to individually identify the members. The member information is a name, sex, a date of joining, an accumulated point total, a purchase history, and the like. The members carry member cards on which member codes of the members are recorded. Alternatively, the members install specific application software for store members on their smartphones. When the application software is started, a barcode or a two-dimensional code representing the member code is displayed on a display device of the smartphone. If a member code is input to the self-service POS terminal 10, the POS server 20 searches through the member database 22 and provides member information of a member record corresponding the member code to the self-service POS terminal 10.

The attendant terminal 30 is installed in a monitoring place provided near the exit of the checkout place. The attendant terminal 30 displays, on the display device, for example, a list of purchased commodities registered for each of the self-service POS terminals 10. If an error occurs in the self-service POS terminal 10, the attendant terminal 30 informs information concerning the error. An employee, a so-called attendant present in the monitoring place performs monitoring of the checkout place based on information displayed or informed in the attendant terminal 30. In FIG. 1, one attendant terminal 30 is illustrated. However, a plurality of attendant terminals 30 may be connected to the communication network 40. At least one of the attendant terminals 30 may be installed in a place different from the monitoring place, for example, another floor of the store such as a back office, a help desk, or the like. Such an attendant terminal 30 in a place far separated from the self-service POS terminal 10 can also inform, through the communication network 40, the error information received from the self-service POS terminal 10. Accordingly, even an employee present in a place where the self-service POS terminal 10 cannot be directly confirmed is capable of monitoring the self-service POS terminal 10.

The checkout system 100 includes a camera 50 and a monitoring apparatus 60 for each of the self-service POS terminals 10. The camera 50 and the monitoring apparatus 60 are provided near the self-service POS terminal 10 for a crime prevention purpose for preventing a fraudulent act of a purchaser who operates the self-service POS terminal 10. The monitoring apparatus 60 may be provided on the outside of the self-service POS terminal 10 or may be provided on the inside of the self-service POS terminal 10. The monitoring apparatuses 60 respectively connect the self-service POS terminals 10 and the cameras 50 provided near the self-service POS terminals 10. The monitoring apparatuses 60 are connected to the attendant terminal 30. According to the connection, the monitoring apparatuses 60 can transmit and receive data signals to and from the self-service POS terminals 10 and the attendant terminal 30. The monitoring apparatuses 60 can receive video signals from the cameras 50.

Explanation of the Self-Service POS Terminal

Figure 2:
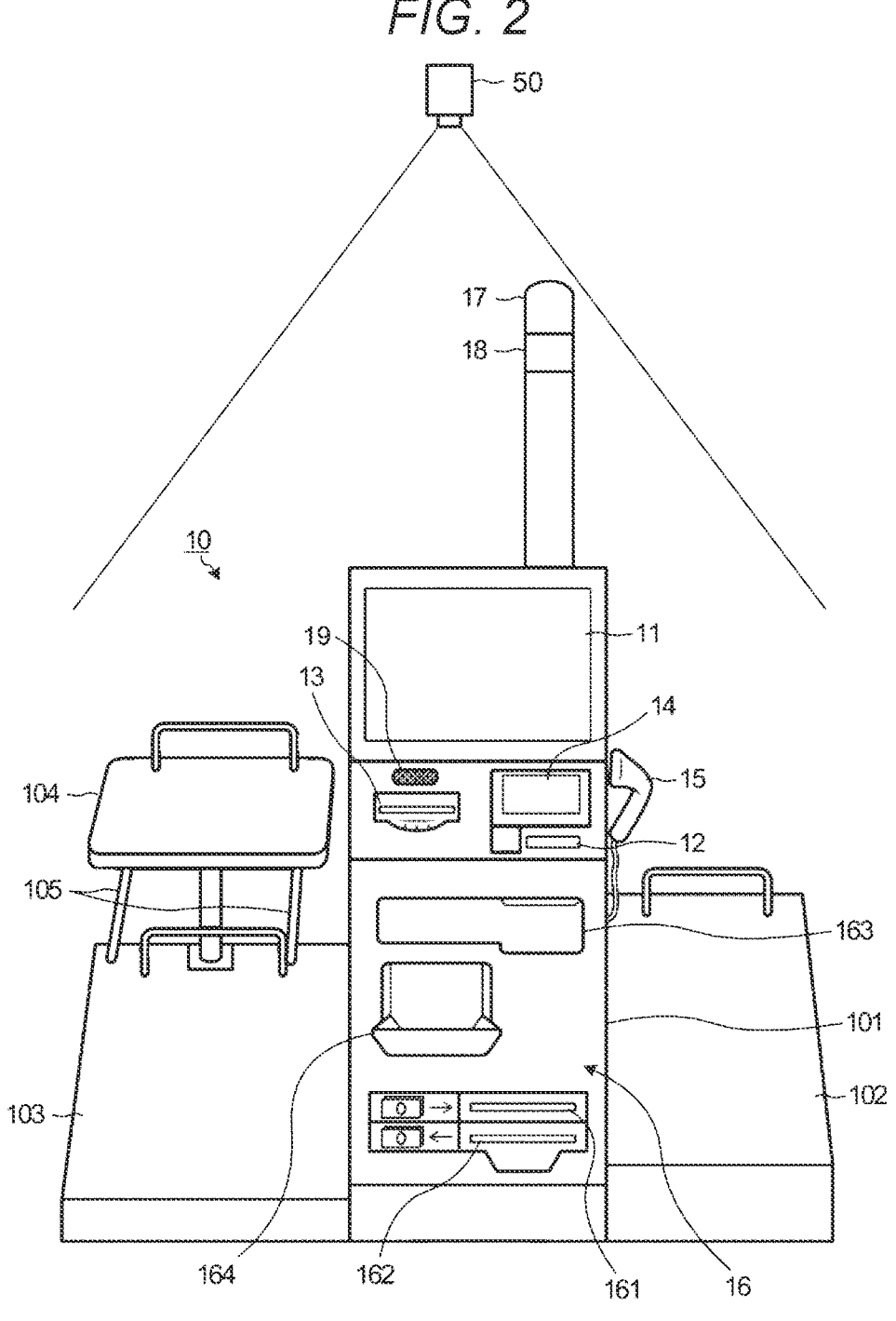
FIG. 2 is a schematic diagram illustrating an exterior configuration of a self-service POS terminal.

FIG. 2 is a schematic diagram illustrating an exterior configuration of the self-service POS terminal 10. The self-service POS terminal 10 includes a main body 101 and a first commodity placing table 102 and a second commodity placing table 103 disposed on the left and the right of the main body 101. The first commodity placing table 102 disposed on the right side of the main body 101 is a table for a customer, who is a purchaser, to place purchased commodities before registration. The purchased commodities before registration are usually put in a shopping basket and placed on the first commodity placing table 102. The unregistered commodities may be disposed in the front or above the first commodity placing table 102 on a shopping cart or the like.

The second commodity placing table 103 disposed on the left side of the main body 101 is a table for the purchaser to place the purchased commodities after registration. The commodities after registration are put in a storage body, for example, a shopping basket, a register bag, or a reusable shopping bag placed on the second commodity placing table 103. The commodities after registration may be directly placed on the second commodity placing table 103. In FIG. 2, the second commodity placing table 103 is provided with a temporary placing table 104 in an upper part thereof on columns. The temporary placing table 104 is, for example, a table for temporarily placing commodities before the commodities are put in a register bag or the like. In the temporary placing table 104, two holding arms 105 are provided on the left and the right for holding open a register bag, a reusable shopping bag, or the like.

The first commodity placing table 102 and the second commodity placing table 103 function as placing sections for commodities. The attachment positions of the first commodity placing table 102 and the second commodity placing table 103 may be reversed in some examples.

The main body 101 includes a touch panel 11 functioning as an input and output device, a card reader 12, a printer 13, a scanner 14, a hand scanner 15, a cash processing machine 16, a rotary beacon light 17, a light emitting unit 18, and a speaker 19.

The touch panel 11 is a display device that displays display elements such as text, characters, symbols, signs, icons, and images on a display. The touch panel 11 is also an input device that detects, with a sensor, a touch operation position on the display and regards that a display element in the position is input and processes the display element. Various screens such as a settlement start screen, a commodity registration screen, a payment method selection screen, and a settlement end screen are displayed on the display. The settlement start screen is a screen for receiving a settlement start instruction for a transaction. A start key for instructing the settlement start is disposed on the settlement start screen. If a touch sensor detects that the start key is touched, the screen of the display is switched from the settlement start screen to the commodity registration screen.

The commodity registration screen is a screen that displays detail information such as a commodity name, a price, and a total amount of the registered commodities. A checkout key for instructing a transition to price payment (settlement) for the registered commodities is disposed on the commodity registration screen. If the touch sensor detects that the checkout key was touched, the screen of the display is switched from the commodity registration screen to the payment method selection screen.

The payment method selection screen is a screen for receiving a selection input for selecting a payment method such as cash payment, credit card payment, electronic money payment, and code settlement payment. A cash key, a credit key, an electronic money key, a code settlement key, and the like are disposed on the payment method selection screen. The purchaser touches a key of a desired payment method. If the touch sensor detects that the cash key was touched, settlement processing by cash is executed. Then, the screen of the display is switched from the payment method selection screen to a settlement by cash end screen. If the touch sensor detects that the credit key was touched, settlement processing by a credit card is executed. Then, the screen of the display is switched from the payment method selection screen to a settlement by credit card end screen. If the touch sensor detects that the electronic money key was touched, settlement processing by an electronic money card is executed. Then, the screen of the display is switched from the payment method selection screen to a settlement by electronic money card end screen. If the touch sensor detects that the code settlement key was touched, settlement processing by the code for code settlement is executed. Then, the screen of the display is switched from the payment method selection screen to a settlement by code settlement end screen.

For example, the settlement by cash end screen is a screen that displays a total amount of a transaction, a cash deposit amount, a change amount, and the like. For example, the settlement processing by cash is processing for subtracting the total amount of the transaction from the deposit amount to calculate the change amount, dispensing a receipt, and ending the transaction.

The card reader 12 is a device that reads data recorded in a card medium such as a credit card, an electronic money card, or a point card (e.g., a customer loyalty card). If the card medium is a magnetic card, the card reader 12 is a magnetic card reader. If the card medium is an IC card, the card reader 12 is an IC card reader. The self-service POS terminal 10 may include one of the magnetic card reader and the IC card reader as the card reader 12 or may include both of the magnetic card reader and the IC card reader. The card reader 12 may be a card reader writer having a function of writing data in a card.

The printer 13 is a device that prints a purchase receipt, a credit card slip, and the like on receipt paper. The receipt paper on which various data are printed by the printer 13 is cut by a cutter and dispensed from a receipt dispensing port. The printer 13 is implemented as, for example, a thermal printer or a dot impact printer.

The scanner 14 and the hand scanner 15 are input devices of an optical reader type that scan machine readable codes such as a barcode and a two-dimensional code with light and read the machine readable codes. The scanner 14 optically reads a machine readable code held over a reading window (a glass window). The hand scanner 15 is hand-held and operated by the purchaser and is brought close to a machine readable code to optically read the machine readable code. The scanner 14 may be an imaging type that reads a machine readable code from an image captured by a camera. The scanner 14 and the hand scanner 15 can read a machine readable code attached to a commodity or the like and also a machine readable code displayed on a display of a terminal such as a smartphone.

The cash processing machine 16 processes cash payments and change due. The cash processing machine 16 includes a bill depositing port 161, a bill discharging port 162, a coin depositing port 163, and a coin discharging port 164. The cash processing machine 16 processes bills deposited to the bill depositing port 161. The cash processing machine 16 discharges bills serving as change from the bill discharging port 162. The cash processing machine 16 receives and processes coins deposited to the coin depositing port 163. The cash processing machine 16 discharges coins serving as change from the coin discharging port 164.

The rotary beacon light 17 is attached to a distal end of a pole extending in the vertical direction such that the rotary beacon light 17 can be seen from far away. The rotary beacon light 17 includes a light emitting member and a cylinder. The light emitting member is attached to the inside of the cylinder to be rotatable coaxially with the cylinder. If operating, the rotary beacon light 17 can cause the light emitting member to rotate while causing the light emitting member to emit light. The rotary beacon light 17 is a light for displaying an alert. For example, the rotary beacon light 17 lights the light emitting member at a commodity registration time to enable the purchaser or an employee present in the attendant terminal 30 to visually check whether a commodity scan is appropriately performed.

The light emitting unit 18 is disposed below the rotary beacon light 17 on the pole. Like the rotary beacon light 17, the light emitting unit 18 also includes a light emitting member and a cylinder. The light emitting member is capable of selectively emitting light in a plurality of colors. Alternatively, the light emitting unit 18 includes a plurality of light emitting members having light emission colors different from one another. Like the rotary beacon light 17, the light emitting unit 18 is also a light emitting unit for displaying an alert.

The speaker 19 outputs sound such as warning sound serving as an alert, and voice serving as a message.

The camera 50 (functioning as an imaging apparatus) is attached above the main body 101. The camera 50 has an imaging region (field of view) that includes the self-service POS terminal 10 and the purchaser who operates the self-service POS terminal 10. As illustrated in FIG. 2, the display of the touch panel 11, the card insertion port of the card reader 12, the receipt dispensing port of the printer 13, the reading window of the scanner 14, and the bill depositing port 161, the bill discharging port 162, the coin depositing port 163, and the coin discharging port 164 of the cash processing machine 16 are disposed on one surface (hereinafter referred to as front) of the main body 101. During operation, the purchaser stands to face the front of the main body 101 and operates the self-service POS terminal 10. The camera 50 acquires images from above the self-service POS terminal 10 and the purchaser standing in the front of the self-service POS terminal 10. Therefore, the head, the face, both the shoulders, both the arms, the chest, the abdomen, and the like of the purchaser are imaged by the camera 50. The upper surface of the self-service POS terminal 10 including the first commodity placing table 102 and the second commodity placing table 103 disposed on the left and the right across the main body 101 is also imaged by the camera 50.

Figure 3:
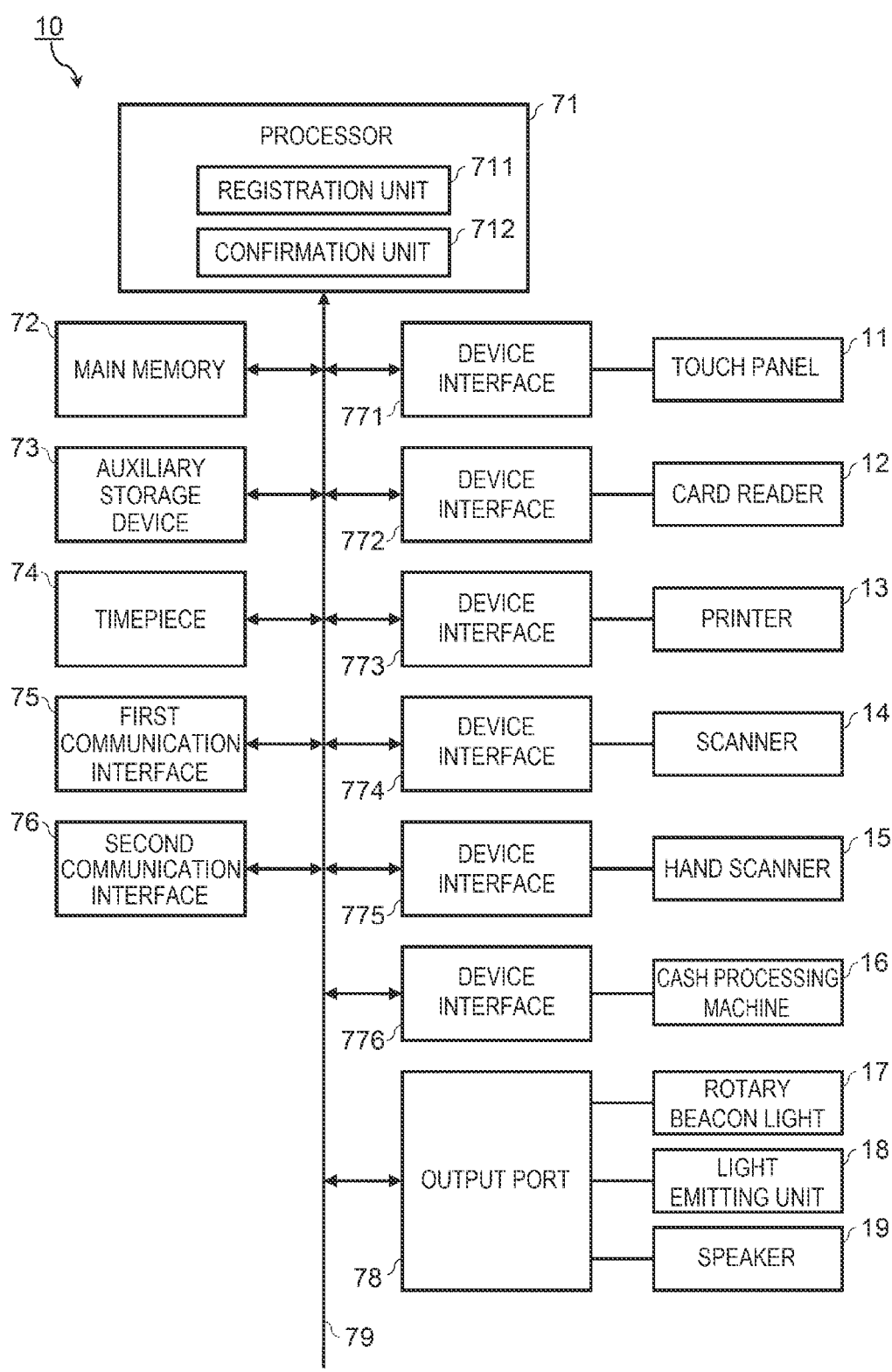
FIG. 3 is a block diagram of a self-service POS terminal.

FIG. 3 is a block diagram illustrating the self-service POS terminal 10. The self-service POS terminal 10 includes a processor 71, a main memory 72, an auxiliary storage device 73, a timepiece 74, a first communication interface 75, a second communication interface 76, a plurality of device interfaces 771 to 776, an output port 78, and a system transmission line 79. The system transmission line 79 includes an address bus, a data bus, and a control signal line. In the self-service POS terminal 10, the processor 71, the main memory 72, the auxiliary storage device 73, the timepiece 74, the first communication interface 75, the second communication interface 76, the plurality of device interfaces 771 to 776, and an output port 78 with the system transmission line 79. In the self-service POS terminal 10, various devices such as a touch panel 791, a card reader 792, a printer 793, a scanner 794, a hand scanner 795, and a cash processing machine 796 are respectively connected to the device interfaces 771 to 776. In the self-service POS terminal 10, the rotary beacon light 17, the light emitting unit 18, and the speaker 19 are connected to the output port 78.

The processor 71 is a central part of a computer. The processor 71 controls the units according to an operating system or application programs in order to realize various functions of the self-service POS terminal 10. The processor 71 is, for example, a CPU (Central Processing Unit).

The main memory 72 includes a nonvolatile memory region and a volatile memory region. The main memory 72 stores the operating system or the application programs in the nonvolatile memory region. The main memory 72 sometimes stores, in the nonvolatile or volatile memory region, data necessary for the processor 71 in executing processing for controlling the units. The main memory 72 uses the volatile memory region as a work area where data is rewritten as appropriate by the processor 71. The nonvolatile memory region is, for example, a ROM (Read Only Memory). The volatile memory region is, for example, a RAM (Random Access Memory).

For example, an EEPROM (Electric Erasable Programmable Read-Only Memory), a HDD (Hard Disk Drive), and an SSD (Solid State Drive) can be the auxiliary storage device 73. The auxiliary storage device 73 stores data used by the processor 71 in performing various processing, data created by the processing in the processor 71, or the like. The auxiliary storage device 73 sometimes stores the application programs described above.

The timepiece 74 tracks a date and time. The processor 71 processes, as a present date and time, the date and the time tracked by the timepiece 74.

The first communication interface 75 is a circuit for performing data communication with the POS server 20 and the attendant terminal 30 connected to the self-service POS terminal 10 via the communication network 40. The second communication interface 76 is a circuit for performing data communication with the monitoring apparatus 60.

The device interface 771 is a circuit for performing data communication with the touch panel 11. The device interface 772 is a circuit for performing data communication with the card reader 12. The device interface 773 is a circuit for performing data communication with the printer 13. The device interface 774 is a circuit for performing data communication with the scanner 14. The device interface 775 is a circuit for performing data communication with the hand scanner 15. The device interface 776 is a circuit for performing data communication with the cash processing machine 16.

The output port 78 outputs a driving signal to the rotary beacon light 17. The rotary beacon light 17 displays an alert according to the driving signal. The output port 78 outputs a driving signal to the light emitting unit 18. The light emitting unit 18 displays an alert according to the driving signal. The output port 78 outputs a driving signal to the speaker 19. The speaker 19 outputs sound such as warning sound serving as an alert or voice serving as a message according to the driving signal.

The self-service POS terminal 10 having such a configuration stores a first program such that the processor 71 includes a registration unit 711 and a confirmation unit 712. The first program is a kind of an application program stored in the main memory 72 or the auxiliary storage device 73. The method of installing the first program in the main memory 72 or the auxiliary storage device 73 is not particularly limited. The first program can be installed in the main memory 72 or the auxiliary storage device 73 from a removable recording medium or by being distributed via a network. A format of the recording medium does not matter so long as the recording medium can store programs like a CD-ROM, a memory card, or the like and can be read by a device.

The registration unit 711 is a unit that performs, based on data relating to a commodity input via an input device that can be operated by a customer himself or herself who is a purchaser, registration processing for information concerning the commodity to be purchased by the purchaser. The input device is the scanner 14 or the hand scanner 15. The input device sometimes can be the touch panel 11.

The confirmation unit 712 is a unit that confirms consent or non-consent by causing a display device to display a consent confirmation screen SCa (see FIG. 10) for obtaining consent of the purchaser to utilizing, for a purpose other than an original purpose, a video of the camera 50 that imaged the purchaser operating the input device. The confirmation unit 712 causes the display device to display the consent confirmation screen SCa before the data relating to the commodity to be purchased by the purchaser is input from the input device. The display device is the touch panel 11. The confirmation unit 712 may cause a display device different from the touch panel 11 to display the consent confirmation screen SCa.

Incidentally, the original purpose of the video of the camera 50 that imaged the purchaser is finding of a fraudulent act. In the case of this embodiment, the utilization other than the original purpose is utilization for improving accuracy of a machine learning model. In this way, if the video of the camera 50 is utilized for some purpose other than the original purpose, from the viewpoint of a personal information protection law, it may be necessary to notify the purchaser in the video of this additional intended use (purpose) and obtain consent of the purchaser to such additional use. The consent confirmation screen SCa is a screen for the purchaser to confirm whether the purchaser consents to the use.

Explanation of the Monitoring Apparatus

The monitoring apparatus 60 is an apparatus for monitoring, based on information such as a video captured by the camera 50, a fraudulent action of a purchaser to the self-service POS terminal 10. The fraudulent action is, for example, an action of bagging a purchased commodity without registering the purchased commodity in the self-service POS terminal 10. The fraudulent action is, for example, an action of exiting the checkout place without paying a price of a purchased commodity. If detecting a fraudulent action of the purchaser, the monitoring apparatus 60 emits a warning. The warning is emitted to both or just one of the self-service POS terminal 10 and the attendant terminal 30.

In this way, the monitoring apparatus 60 is an apparatus for utilizing the video of the camera 50 for the original purpose. On the other hand, the monitoring apparatus 60 is also an apparatus for utilizing the video of the camera 50 for a purpose other than the original purpose.

Figure 4:
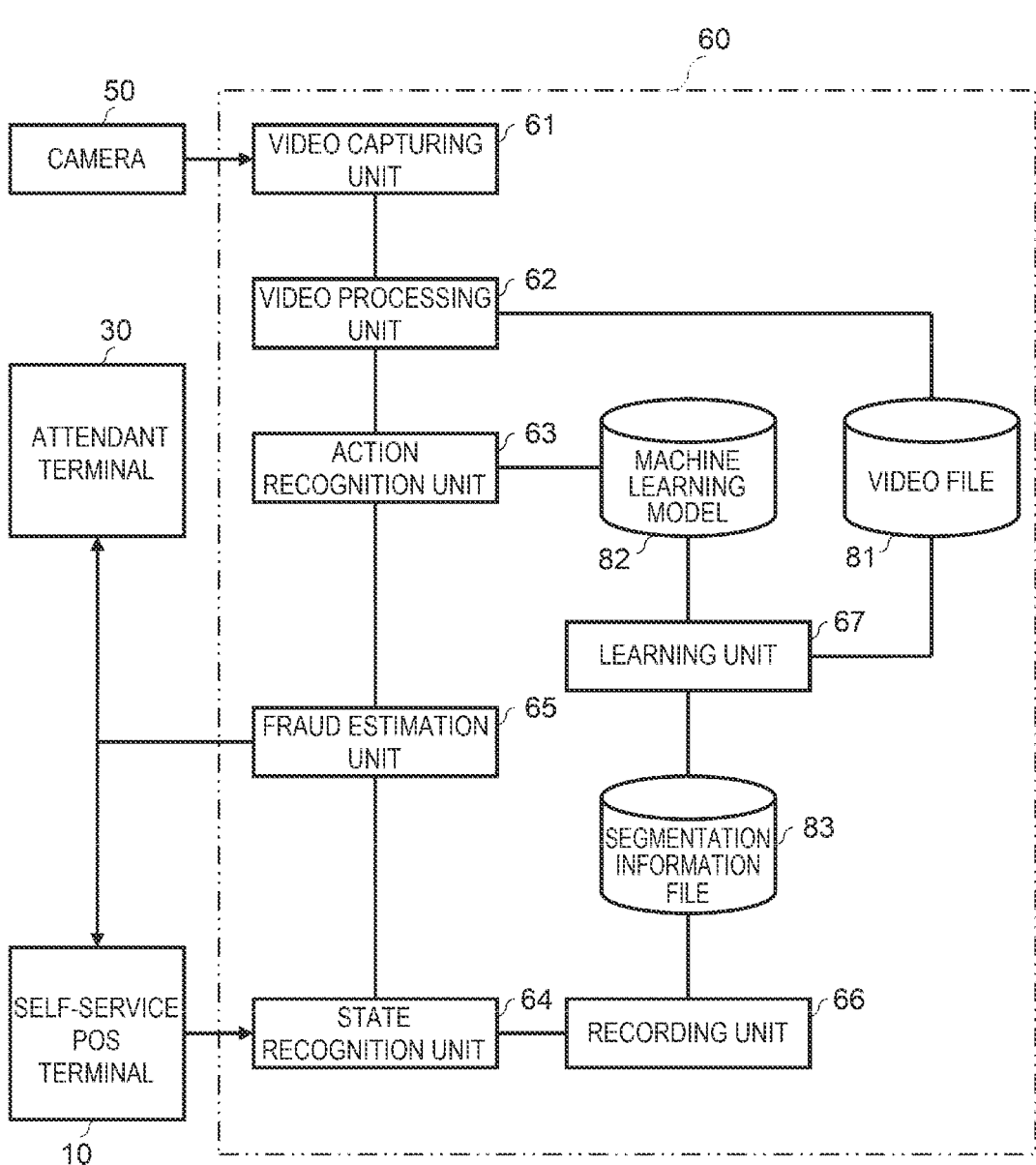
FIG. 4 is a block diagram of certain aspects of a monitoring apparatus.

FIG. 4 is a block diagram illustrating functional aspects of the monitoring apparatus 60. As illustrated, the monitoring apparatus 60 includes functions of a video capturing unit 61, a video processing unit 62, an action recognition unit 63, a state recognition unit 64, a fraud estimation unit 65, a recording unit 66, and a learning unit 67. The monitoring apparatus 60 includes a video file 81, a machine learning model 82, and a segmentation information file 83.

The video capturing unit 61 is a function of capturing, for each of frames, in order along a time axis, videos captured by the camera 50. The video processing unit 62 is a function of giving the videos captured via the video capturing unit 61 to the action recognition unit 63 and writing the video in the video file 81. In the video file 81, the videos captured by the camera 50 are sequentially stored in correlation with data of imaging time. The videos stored in the video file 81 are deleted if a fixed period elapses.

The action recognition unit 63 is a function of recognizing, from a video captured by the camera 50, an action of the purchaser to the self-service POS terminal 10. Specifically, the action recognition unit 63 recognizes an action of the purchaser using the machine learning model 82. That is, the action recognition unit 63 inputs the video captured by the camera 50 to the machine learning model 82. The machine learning model 82 analyzes the video using a method of machine learning such as a DNN, a CNN, or an RNN and recognizes an action of the purchaser such as a taking-out action, a bagging action, or an exiting action. The action recognition unit 63 acquires the action of the purchaser recognized by the machine learning model 82 and outputs the action to the fraud estimation unit 65.

Incidentally, the taking-out action is an action of taking out an unregistered purchased commodity from the first commodity placing table 102 of the self-service POS terminal 10. The bagging action is an action of putting a registered purchased commodity in a register bag or the like present on the first commodity placing table 102 of the self-service POS terminal 10. The exiting action is an action of the purchaser, who finished checkout of the purchased commodity in the self-service POS terminal 10, exiting the checkout place.

The state recognition unit 64 is a function of recognizing a state of the self-service POS terminal 10. As the state of the self-service POS terminal 10, there are a pre-settlement start state, a state during commodity registration, a state during settlement processing, a settlement end state. The pre-settlement start state is a state in which the settlement start screen is displayed on the touch panel 11. That is, the state recognition unit 64 recognizes that the self-service POS terminal 10 is in the pre-settlement start state while the settlement start screen is displayed on the touch panel 11.

If the start key of the settlement start screen is touched, the screen of the touch panel 11 is switched from the settlement start screen to the commodity registration screen. For example, if a purchased commodity is registered by scanning operation of the scanner 14 or the hand scanner 15, the commodity registration screen is updated. Every time the commodity registration screen of the touch panel 11 is updated, the state recognition unit 64 recognizes that the self-service POS terminal 10 is in the state during commodity registration.

If the checkout key of the commodity registration screen is touched, the screen of the touch panel 11 is switched from the commodity registration screen to the payment method selection screen. If the screen of the touch panel 11 is switched to the payment method selection screen, the state recognition unit 64 recognizes that the self-service POS terminal 10 is in the state during settlement processing.

For example, if the cash key of the payment method selection screen is touched and cash necessary for settlement is deposited to the cash processing machine 16, the screen of the touch panel 11 is switched from the payment method selection screen to the settlement end screen. If the screen of the touch panel 11 is switched to the settlement end screen, the state recognition unit 64 recognizes that the self-service POS terminal 10 is in the settlement end state.

The fraud estimation unit 65 is a function of estimating a fraudulent action of the purchaser based on the action of the purchaser recognized by the action recognition unit 63 and the state of the self-service POS terminal 10 recognized by the state recognition unit 64. For example, if the state recognition unit 64 did not recognize the state during commodity registration regardless of the fact that the action recognition unit 63 recognized the taking-out action and the bagging action, the fraud estimation unit 65 estimates that a fraudulent action of bagging a commodity without registering the commodity for purchase at the self-service POS terminal 10 was performed. For example, if the action recognition unit 63 recognized the exiting action regardless of the fact that the state recognition unit 64 did not recognize the settlement end state, the fraud estimation unit 65 estimates that a fraudulent action of exiting the checkout place without paying a price of a purchased commodity was performed. Types of fraudulent actions and estimation methods for the fraudulent actions are not limited to those explained above.

The recording unit 66 is a function of recording segmentation data 831 (see FIG. 5) in the segmentation information file 83 based on the state of the POS terminal 10 recognized via the state recognition unit 64. The segmentation data 831 is configured by, as illustrated in FIG. 5, a segmentation start date and time, a segmentation end date and time, a consent flag, and a learning flag.

The segmentation start date and time is a date and time at a point in time when the state of the self-service POS terminal 10 was switched from the pre-settlement start state to the state during commodity registration. The segmentation end date and time is a date and time at a point in time when the state of the self-service POS terminal 10 was switched from the state during settlement processing to the settlement end state. The consent flag is one-bit data for identifying whether consent to utilizing, in a purpose other than the original purpose, a video captured by the camera 50 within a time from the segmentation start date and time until the segmentation end date and time was obtained from the purchaser. In this embodiment, the consent flag in the case in which the consent was obtained is "1" and the consent flag in the case in which the consent was not obtained is "0". The learning flag is one-bit data for identifying whether to use, for learning of the machine learning model 82, the video captured by the camera 50 within the time from the segmentation start date and time until the segmentation end date and time. In this embodiment, the learning flag in the case in which the video is used for the learning is "1" and the learning flag in the case in which the video is not used for the learning is "0".

The learning unit 67 is a function of segmenting a video stored in the video file 81 according to segmentation data recorded in the segmentation information file 83 and executing the learning of the machine learning model 82 using the segmented video. That is, the learning unit 67 sets the segmented video as input data to the machine learning model 82, generates learning data obtained by combining an expected action of the purchaser with the input data as a correct answer label, and executes the learning of the machine learning model 82. Accuracy of the machine learning model 82 is improved by executing such learning using a large amount of learning data.

As explained above, in the monitoring apparatus 60, the video capturing unit 61, the video processing unit 62, the action recognition unit 63, the state recognition unit 64, and the fraud estimation unit 65 are functions for utilizing the video of the camera 50 for the original purpose. The recording unit 66 and the learning unit 67 are functions for utilizing the video of the camera 50 for a purpose other than the original purpose.

FIG. 6 is a block diagram illustrating the monitoring apparatus 60. The monitoring apparatus 60 includes a processor 91, a main memory 92, an auxiliary storage device 93, a timepiece 94, a GPU (Graphics Processing Unit) 95, a camera interface 96, a first terminal interface 97, a second terminal interface 98, and a system transmission line 99. The system transmission line 99 includes an address bus, a data bus, and a control signal line. The system transmission line 99 connects the processor 91 and the other units and transmits data signals exchanged between the processor 91 and the units.

In the monitoring apparatus 60 is a computer with the system transmission line 99 connecting the processor 91, the main memory 92, the auxiliary storage device 93, the timepiece 94, the GPU 95, the camera interface 96, the first terminal interface 97, and the second terminal interface 98.

In general, the processor 91, the main memory 92, the auxiliary storage device 93, and the timepiece 94 are substantial similar to the processor 71, the main memory 72, the auxiliary storage device 73, and the timepiece 74 explained with reference to FIG. 3. Therefore, additional explanation of the processor 91, the main memory 92, the auxiliary storage device 93, and the timepiece 94 is omitted here.

The GPU 95 is an arithmetic device functioning as an accelerator that supports arithmetic processing performed by the CPU 91. In the monitoring apparatus 60, the GPU 95 is used to quickly execute an arithmetic operation for video processing performed mainly using the machine learning model 82.

The camera interface 96 connects the camera 50 to the monitoring apparatus 60. The camera interface 96 outputs a control signal for controlling driving of the camera 50 to the camera 50. The camera 50 performs an imaging operation according to the control signal. The camera interface 96 captures video data captured by the camera 50.

The first terminal interface 97 connects the self-service POS terminal 10 to the monitoring apparatus 60. The first terminal interface 97 captures, from the self-service POS terminal 10, for example, data of a screen displayed on the touch panel 11.

The second terminal interface 98 connects the attendant terminal 30 to the monitoring apparatus 60. The second terminal interface 98 outputs an alert signal and the like to the attendant terminal 30.

The monitoring apparatus 60 realizes, with the circuit configuration explained above, the functions of the video capturing unit 61, the video processing unit 62, the action recognition unit 63, the state recognition unit 64, the fraud estimation unit 65, the recording unit 66, and the learning unit 67. Further, the monitoring unit 60 stores a second program such that the processor 91 includes a first date and time acquisition unit 911, a second date and time acquisition unit 912, and a recording unit 913. The second program is a type of an application program stored in the main memory 92 or the auxiliary storage device 93. A method of installing the second program in the main memory 92 or the auxiliary storage device 93 is not particularly limited. The second program can be installed in the main memory 92 or the auxiliary storage device 93 by being recorded in a removable recording medium or by being distributed by communication via a network. A form of the recording medium does not matter if the recording medium can store a program like a CD-ROM, a memory card, or the like and can be read by a device.

The first date and time acquisition unit 911 acquires a date and time when selection input of consent was received by the confirmation unit 712 at the self-service POS terminal 10. The second date and time acquisition unit 912 acquires a date and time when checkout of a commodity registered by the registration unit 711 ended at the self-service POS terminal 10. The first date and time acquisition unit 911 and the second date and time acquisition unit 912 are implemented by the function of the state recognition unit 64.

The recording unit 913 is a unit that records, in the segmentation information file 83, as the segmentation start date and time of the video captured by the camera 50, the date and time acquired by the first date and time acquisition unit 911 and records, in the segmentation information file 83, as a segmentation end date and time of the video captured by the camera 50, the date and time acquired by the second date and time acquisition unit 912. The recording unit 913 is implemented by the function of the recording unit 66.

Operation Explanation of the Checkout System

Figure 7:
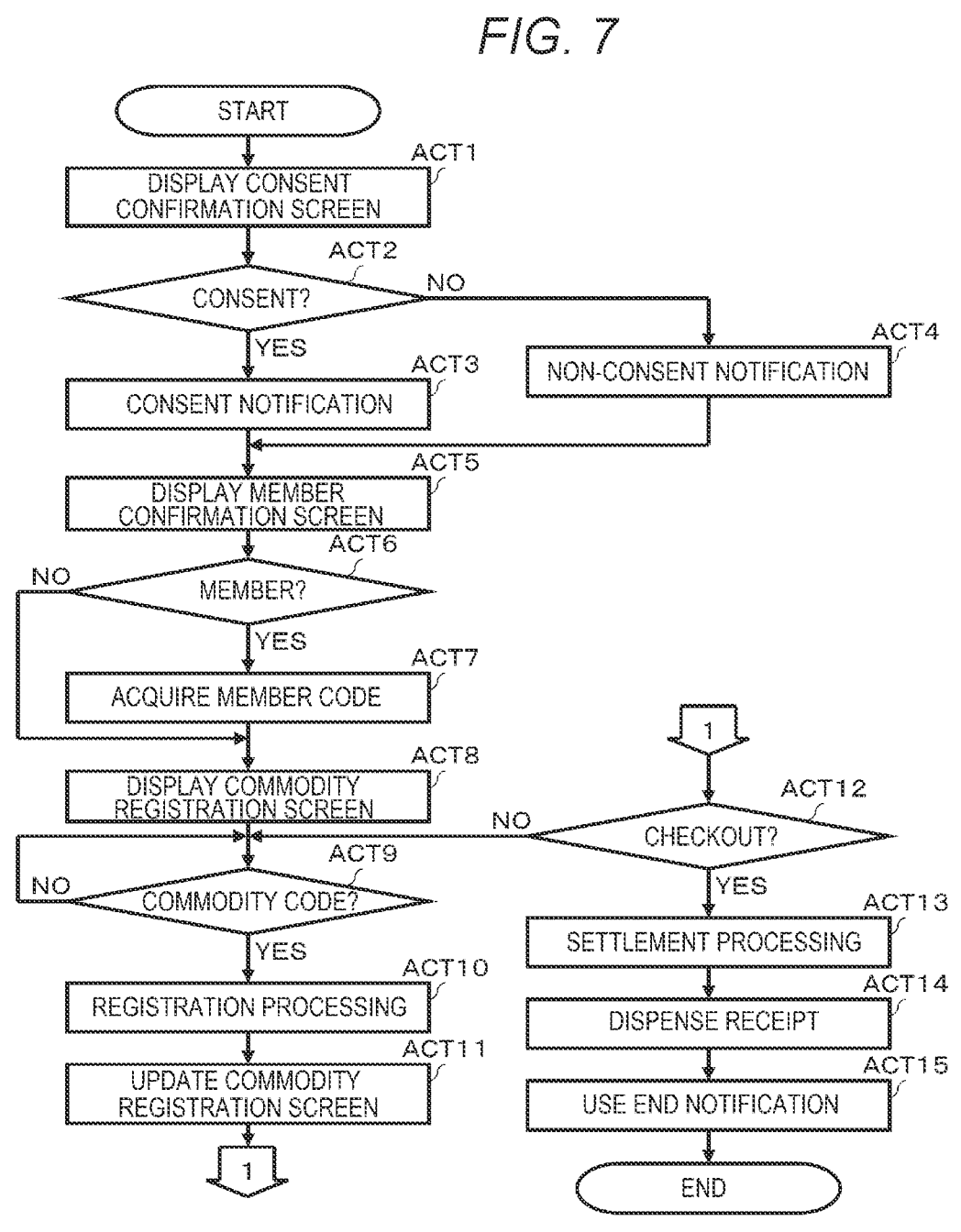
Figure 8:
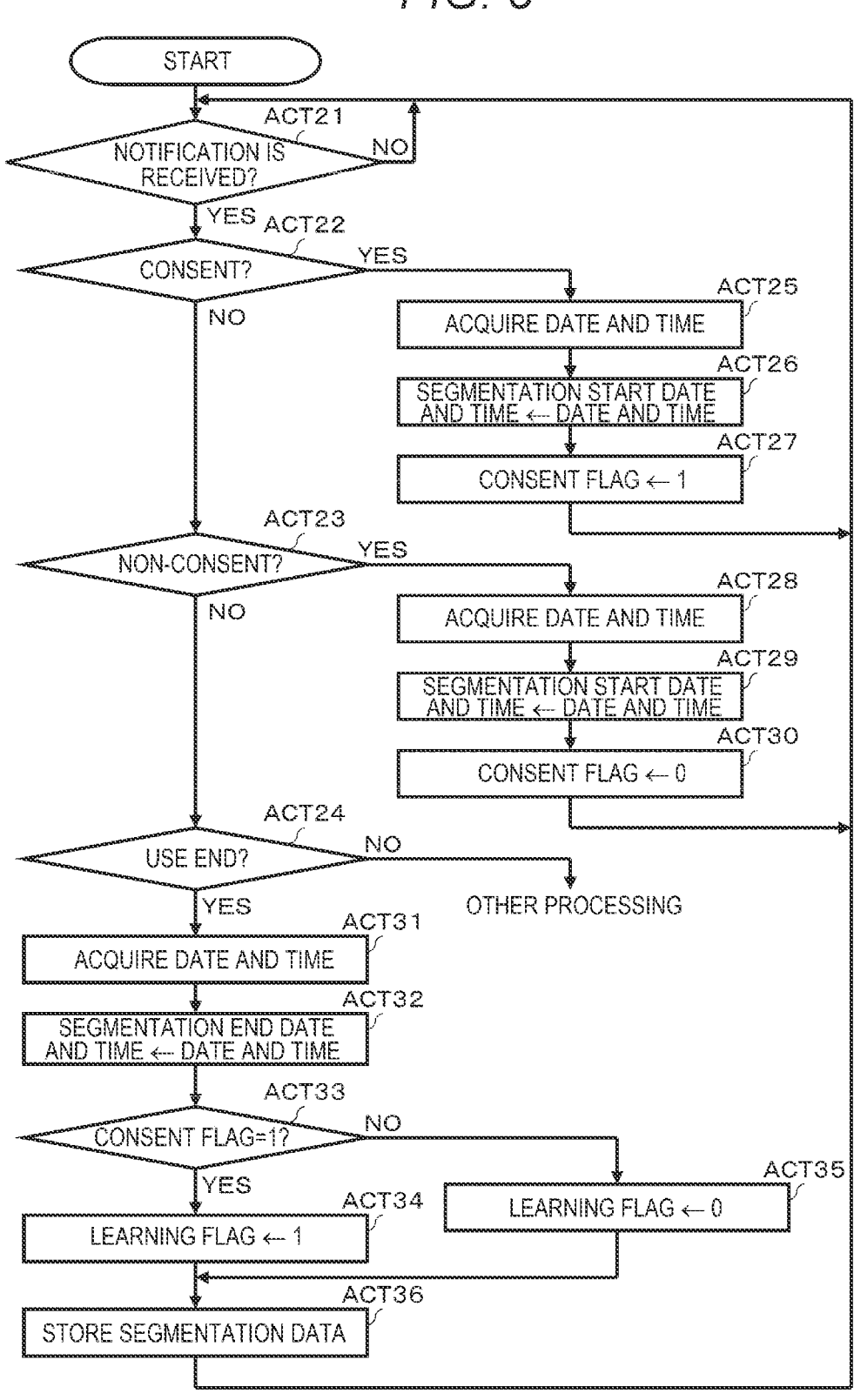
FIG. 8 is a flowchart of information processing executed by a processor of a monitoring apparatus.
Figure 9:
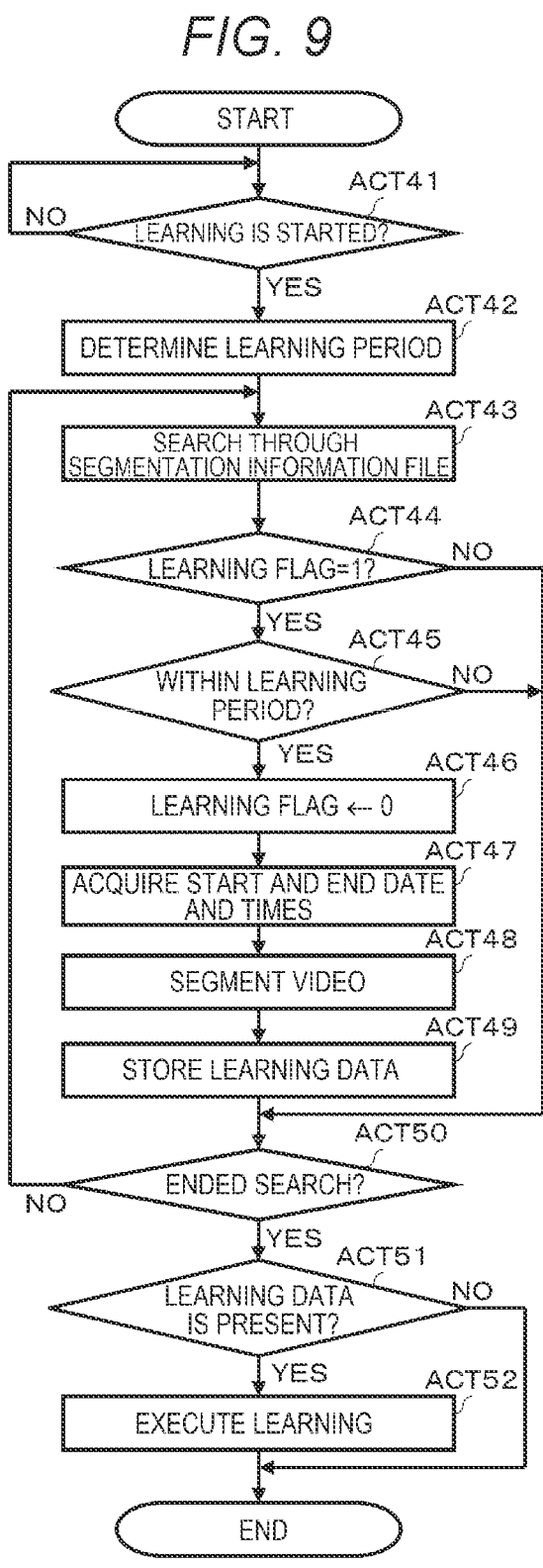
FIG. 9 is a flowchart of information processing executed by a processor of a monitoring apparatus.
Figures 10, 11:
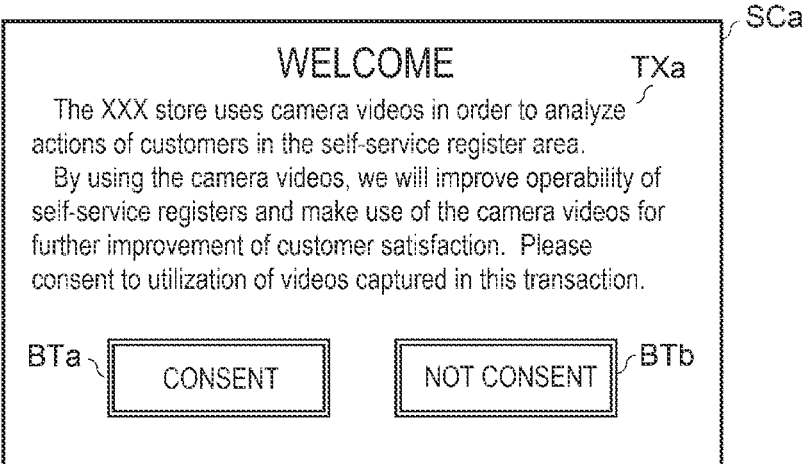
FIG. 10 is a schematic diagram illustrating a consent confirmation screen displayed on a touch panel of the self-service POS terminal.
FIG. 11 is a schematic diagram illustrating a data structure of a checkout record stored in a member database.

FIG. 7 is a flowchart illustrating information processing executed by the processor 71 of the self-service POS terminal 10 according to the first program. FIGS. 8 and 9 are flowcharts illustrating a procedure of main information processing executed by the processor 91 of the monitoring apparatus 60 according to the second program. FIG. 10 is a schematic diagram illustrating the consent confirmation screen SCa displayed on the touch panel 11 of the self-service POS terminal 10. Subsequently, operations of the self-service POS terminal 10 and the monitoring apparatus 60 configuring the checkout system 100 are explained with reference to the figures. The procedures and content of the information processing explained below are examples. The procedures and the content can be changed as appropriate so long as the same results can be achieved. The consent confirmation screen SCa is also an example. The arrangement of display elements, content of text, and the like can be changed as appropriate.

(Operation of the Self-Service POS Terminal)

If the self-service POS terminal 10 is in an idle state in which the self-service POS terminal 10 is not being operated by a purchaser, in ACT 1, the processor 71 causes, via the device interface 771, the touch panel 11 to display the consent confirmation screen SCa. As illustrated in FIG. 10, first text TXa for obtaining consent of the purchaser is displayed on the consent confirmation screen SCa. Softkeys of a [consent] button BTa and a [not consent] button BTb are disposed. The [consent] button BTa and the [not consent] button BTb are first operation pieces for receiving selection input of consent or non-consent. The consent confirmation screen SCa functions as the settlement start screen. That is, the softkeys of the [consent] button BTa and the [not consent] button BTb function as a start key.

Therefore, the purchaser who put a commodity in a shopping basket or a shopping cart on the selling floor then moved to the checkout place and stood in the front of an available (not in use) self-service POS terminal 10 checks the consent confirmation screen SCa first. The purchaser at the self-service POS terminal 10 reads the text TXa and, if consenting to utilizing the video of the camera 50 for a purpose other than the original purpose, touches the [consent] button BTa. If not consenting to use of the video for a purpose other than the original purpose, the purchaser touches the [not consent] button BTb. After [consent] button BTa or the [not consent] button BTb is touched, the self-service POS terminal 10 becomes capable of registering the commodity for purchase.

In ACT 2, the processor 71 waits for the [consent] button BTa or the [not consent] button BTb to be touched. If the [consent] button BTa was touched and a corresponding signal input via the device interface 771, the processor 71 proceeds from ACT 2 to ACT 3. In ACT 3, the processor 71 transmits a consent notification signal to the monitoring apparatus 60 via the second communication interface 76.

If the [not consent] button BTb was touched and a corresponding signal input via the device interface 771, the processor 71 proceeds from ACT 2 to ACT 4. In ACT 4, the processor 71 transmits a non-consent notification signal to the monitoring apparatus 60 via the second communication interface 76.

The processor 71 then proceeds to ACT 5. In ACT 5, the processor 71 causes, via the device interface 771, the touch panel 11 to display a member confirmation screen. On the member confirmation screen, text for asking the purchaser whether the purchaser is a member of the store is displayed. Softkeys of a [member] button and a [non-member] button are disposed on the member confirmation screen. The [member] button and the [non-member] button are second operation pieces for receiving selection input for a member or a non-member. A non-member purchaser touches the [non-member] button. A member touches the [member] button. The purchaser (member) inputs a member code to the self-service POS terminal 10. That is, a purchaser possessing a member card causes the card reader 12 to read data of the member card. A purchaser who installed application software for a store member in a smartphone causes the scanner 14 or the hand scanner 15 to read a barcode or a two-dimensional code representing a member code displayed on a display device of the smartphone.

In ACT 6, the processor 71 waits for the [member] button or the [non-member] button to be touched. If the [member] button was touched and a corresponding signal input via the device interface 771, the processor 71 proceeds from ACT 6 to ACT 7. In ACT 7, the processor 71 reads data of a member card from the card reader 12 via the device interface 772. The processor 71 detects a member code from the data of the member card. Alternatively, the processor 71 acquires, via the device interface 774 or the device interface 775, data of a barcode or a two-dimensional code read by the scanner 14 or the hand scanner 15. The processor 71 detects the member code from the data of the barcode or the two-dimensional code.

If the [non-member] button was touched and a corresponding signal input via the device interface 771, the processor 71 skips the processing in ACT 7.

After skipping the processing in ACT 7, the processor 71 proceeds to ACT 8. In the case of a store not adopting a member system, a program can be configured such that the processor 71 skips the processing in ACT 5 to ACT 7 and proceeds from ACT 3 or ACT 4 to ACT 8.

In ACT 8, the processor 71 causes, via the device interface 771, the touch panel 11 to display the commodity registration screen. The commodity registration screen is a screen that displays detail information such as a commodity name, a price, and a total amount of a registered purchased commodity. The purchaser starts a registration operation for a purchased commodity. That is, the purchaser picks up, one by one, unregistered commodities from the first commodity placing table 102. The purchaser holds a barcode of the unregistered commodity over the reading window of the scanner 14. Alternatively, the purchaser brings the hand scanner 15 close to the barcode of the commodity. After the barcode of the commodity is read by such operation, the purchaser puts the purchased commodity in a register bag or the like prepared at the second commodity placing table 103.

In ACT 9, the processor 71 waits for a commodity code to be input. Upon acquiring, via the device interface 774 or the device interface 775, a barcode read by the scanner 14 or the hand scanner 15 and detecting a commodity code of a commodity from data of the barcode, the processor 71 proceeds from ACT 9 to ACT 10. In ACT 10, the processor 71 performs registration processing for the purchased commodity. Specifically, the processor 71 acquires a commodity record associated with the commodity code of the purchased commodity from the commodity database 21 and generates commodity sales data based on the commodity code, the commodity name, the price, and the like of the commodity record. The processor 71 registers the commodity sales data in a transaction memory. The transaction memory is a region of the main memory 92 for storing commodity sales data of purchased commodities for one transaction.

After finishing the registration processing for the purchased commodity, the processor 71 proceeds to ACT 11. In ACT 11, the processor 71 updates the commodity registration screen. That is, the processor 71 causes the touch panel 11 to display the commodity name, the price, and the like of the purchased commodity. The processor 71 updates a total number of articles, a total amount, and the like of the purchased commodity to latest values. Thereafter, the processor 71 proceeds to ACT 12.

A softkey of a [checkout] button is disposed on the commodity registration screen. The [checkout] button is an example of a checkout key for instructing for transition to price payment for the registered purchased commodity. The processor 71 checks whether the [checkout] button was touched. If the [checkout] button was not touched, the processor 71 returns to ACT 9. The processor 71 waits for a commodity code of the next purchased commodity to be input. If a commodity code is input, the processor 71 again executes the processing in ACT 10 and ACT 11 as explained above.

If the [checkout] button was touched and a corresponding signal input via the device interface 771, the processor 71 proceeds from ACT 12 to ACT 13. In ACT 13, the processor 71 executes settlement processing. For example, if cash payment was selected as a payment method, the processor 71 executes settlement processing by cash. If credit card payment was selected, the processor 71 executes settlement processing by a credit card. If electronic money payment was selected, the processor 71 executes settlement processing by electronic money.

Upon finishing the settlement processing, the processor 71 proceeds to ACT 14. In ACT 14, the processor 71 outputs receipt data to the printer 13 via the device interface 773 and controls dispensing of a transaction receipt. After finishing dispensing the transaction receipt, the processor 71 proceeds to ACT 15. In ACT 15, the processor 71 transmits a use end notification signal to the monitoring apparatus 60 via the second communication interface 76. Then, the processor 71 ends the information processing of the procedure illustrated in the flowchart of FIG. 7. The processor 71 returns to the idle state. Therefore, the screen of the touch panel 11 changes to the consent confirmation screen SCa.

The processor 71 includes the registration unit 711 as explained for the processing in ACT 8 to ACT 11. The processor 71 includes the confirmation unit 712 as explained for the processing in ACT 1 to ACT 4. The processor 71 (as the confirmation unit 712), receives a selection input of consent outputs the consent notification signal to the monitoring apparatus 60 if the purchaser consented to utilizing the video of the camera 50 for a purpose other than the original purpose (ACT 3) and outputs the non-consent notification signal to the monitoring apparatus 60 if the purchaser did not consent to further use the video of the camera 50 (ACT 4). Once a transaction receipt indicating details of items registered by the registration unit 711 is dispensed and the checkout ends, the processor 71 outputs the use end notification signal to the monitoring apparatus 60 (ACT 15).

(Operation of the Monitoring Apparatus)

The monitoring apparatus 60 performs an operation 1 and an operation 2 in addition to a primary operation for monitoring (by the camera 50) an action of a purchaser who operates a self-service POS terminal 10 for a fraudulent act by, for example, estimated movement of a hand in the video from camera.

(Operation 1)

As illustrated in FIG. 8, in ACT 21, the processor 91 of the monitoring apparatus 60 waits for a notification signal from the self-service POS terminal 10. If receiving a notification signal via the first terminal interface 97, the processor 91 proceeds from ACT 21 to ACT 22. In ACT 22, the processor 91 checks whether the consent notification signal was received. If the notification signal is not the consent notification signal, the processor 91 proceeds from ACT 22 to ACT 23. In ACT 23, the processor 91 checks whether the non-consent notification signal was received. If the notification signal is not the non-consent notification signal, the processor 91 proceeds from ACT 23 to ACT 24. In ACT 24, the processor 91 checks whether the use end notification signal was received.

The notification signal from the self-service POS terminal 10 is not limited to three types of the consent notification signal, the non-consent notification signal, and the use end notification signal explained above. If receiving a notification signal other than the three types, the processor 91 executes other processing corresponding to the notification signal. Explanation about details of the other processing is omitted.

If receiving the consent notification signal from the self-service POS terminal 10, the processor 91 proceeds from ACT 22 to ACT 25. In ACT 25, the processor 91 acquires a present date and time tracked by the timepiece 94. In ACT 26, the processor 91 sets the date and time as the segmentation start date and time. In ACT 27, the processor 91 sets the consent flag to "1". Upon finishing the processing explained above, the processor 91 returns to ACT 21 and waits for the next notification signal to be received.

If receiving the non-consent notification signal from the self-service POS terminal 10, the processor 91 proceeds from ACT 23 to ACT 28. In ACT 28, the processor 91 acquires the present date and time tracked by the timepiece 94. In ACT 29, the processor 91 sets the date and time as the segmentation start date and time. In ACT 30, the processor 91 sets the consent flag to "0". Upon finishing the processing explained above, the processor 91 returns to ACT 21 and waits for the next notification signal to be received.

Upon receiving the use end notification signal from the self-service POS terminal 10, the processor 91 proceeds from ACT 24 to ACT 31. In ACT 31, the processor 91 acquires the present date and time tracked by the timepiece 94. In ACT 32, the processor 91 sets the date and time as the segmentation end date and time.

In ACT 33, the processor 91 checks the consent flag. If the consent flag is set to "1", that is, if receiving the consent notification signal, the processor 91 proceeds from ACT 33 to ACT 34. In ACT 34, the processor 91 sets the learning flag to "1". If the consent flag is set to "0", that is, if receiving the non-consent notification signal, the processor 91 proceeds from ACT 33 to ACT 35. In ACT 35, the processor 91 sets the learning flag to "0".

If finishing the processing in ACT 34 or ACT 35, the processor 71 proceeds to ACT 36. In ACT 36, the processor 91 stores the segmentation data 831. That is, the processor 71 creates the segmentation data 831 from the segmentation start date and time obtained in the processing in ACT 26 or ACT 29, the segmentation end date and time obtained in the processing in ACT 32, the consent flag obtained in the processing in ACT 27 or ACT 30, and the learning flag obtained in the processing in ACT 34 or ACT 35. The processor 91 stores the segmentation data 831 in the segmentation information file 83. Thereafter, the processor 91 returns to ACT 21 and waits for the next notification signal to be received.

As explained above, the processor 91 includes the first date and time acquisition unit 911 as explained as the processing in ACT 25 and ACT 26. The processor 91 includes the second date and time acquisition unit 912 as explained as the processing in ACT 31 and ACT 32. Further, the processor 91 includes the recording unit 913 as explained as the processing in ACT 36.

That is, if the purchaser touched the [consent] button BTa of the consent confirmation screen SCa functioning as the settlement start screen and consented to utilizing the video of the camera 50 for a purpose other than the original purpose in the monitoring target self-service POS terminal 10, the processor 91 acquires a date and time at that point in time as the segmentation start date and time. If checkout of a commodity to be purchased by the purchaser ends in the self-service POS terminal 10, the processor 91 acquires a date and time at that point in time as the segmentation end date and time. The processor 91 stores the segmentation data 831 including the segmentation start date and time and the segmentation end date and time in the segmentation information file 83. The consent flag included in the segmentation data 831 at this time is a value "1" indicating consent. The learning flag is a value "1" indicating that the video is used for learning.

On the other hand, even if the purchaser touched the [not consent] button BTb of the consent confirmation screen SCa functioning as the settlement start screen and did not consent to utilizing the video of the camera 50 for a purpose other than the original purpose in the monitoring target self-service POS terminal 10, the processor 91 acquires a date and time at that point in time as the segmentation start date and time. If checkout of a commodity to be purchased by the purchaser ends in the self-service POS terminal 10, the processor 91 acquires a date and time at that point in time as the segmentation end date and time. The processor 91 stores the segmentation data 831 including the segmentation start date and time and the segmentation end date and time in the segmentation information file 83. However, the consent flag included in the segmentation data 831 at this time is a value "0" indicating non-consent. The learning flag is a value "0" indicating that the video is not used for learning.
(Operation 2)

The monitoring apparatus 60 sets a learning schedule of the machine learning model 82. For example, a schedule for learning the machine learning model 82 at 6:00 AM every day is set. Data concerning the schedule is stored in, for example, the auxiliary storage device 93. A learning period is also set in the data concerning the schedule. For example, if the machine learning model 82 is learned every day as in the example explained above, the learning period only has to be set to 24 hours in the past. Alternatively, the learning period may be set as a time period when fraud easily occurs, for example, 15:00 to 18:00 when registers are crowded. A load on an apparatus required for the learning is reduced by shortening the learning period. On the other hand, if the learning period is short, accuracy of the machine learning model 82 is not improved. Accordingly, it is optional how to decide the learning period.

The processor 91 waits for the present date and time tracked by the timepiece 94 in ACT 41 to reach a start date and time of the learning schedule. If the present date and time reaches the start date and time, the processor 91 proceeds from ACT 41 to ACT 42. In ACT 42, the processor 91 determines a learning period. Since the learning period is set as the data concerning the schedule as explained above, the processor 91 determines the set period as the learning period.

If determining the learning period, the processor 91 proceeds to ACT 43. In ACT 43, the processor 91 searches through the segmentation information file 83. For example, the processor 91 retrieves the segmentation data 831 in ascending order of segmentation start date and time from the segmentation information file 83.

In ACT 44, the processor 91 checks whether the learning flag of the retrieved segmentation data 831 is "1". If the learning flag is not "1", that is, is "0", the processor 91 proceeds from ACT 44 to ACT 50. In ACT 50, the processor 91 checks whether the processor 91 ended the search through the segmentation information file 83. If the processor 91 did not end the search through the segmentation information file 83, the processor 91 returns to ACT 43. The processor 91 continues the search through the segmentation information file 83.

On the other hand, if the learning flag of the retrieved segmentation data 831 is "1", the processor 91 proceeds from ACT 44 to ACT 45. In ACT 45, the processor 91 checks whether a date of the segmentation start date and time or the segmentation end date and time of the segmentation data 831 is within the learning period. If the date of the segmentation start date and time or the segmentation end date and time is not within the learning period, the processor 91 proceeds from ACT 45 to ACT 50. That is, the processor 91 checks whether the processor 91 ended the search through the segmentation information file 83. If the processor 91 did not end the search through the segmentation information file 83, the processor 91 continues the search through the segmentation information file 83.

If the date of the segmentation start date and time or the segmentation end date and time is within the learning period, the processor 91 proceeds from ACT 45 to ACT 46. In ACT 46, the processor 91 rewrites the learning flag of the segmentation data 831 from "1" to "0". In ACT 47, the processor 91 acquires the segmentation start date and time and the segmentation end date and time of the segmentation data 831. In ACT 48, the processor 91 segments, from the video file 81, a video captured by the camera 50 within the time from the segmentation start date and time until the segmentation end date and time. In ACT 49, the processor 91 stores, as learning data of the machine learning model 82, the video segmented from the video file 81. Thereafter, the processor 91 proceeds to ACT 50. That is, the processor 91 checks whether the processor 91 ended the search through the segmentation information file 83. If the processor 91 did not end the search through the segmentation information file 83, the processor 91 continues the search through the segmentation information file 83.

Upon ending the search through the segmentation information file 83, the processor 91 proceeds from ACT 50 to ACT 51. In ACT 51, the processor 91 checks whether the learning data is stored. If the learning data is not stored, the processor 91 ends the information processing of the procedure illustrated in the flowchart of FIG. 9.

If the learning data is stored, the processor 91 proceeds from ACT 51 to ACT 52. In ACT 52, the processor 91 executes the learning of the machine learning model 82 using the learning data. Then, the processor 91 ends the information processing of the procedure illustrated in the flowchart of FIG. 9.

As explained above, if the present date and time reaches the start date and time of the learning schedule, the processor 91 detects, from the segmentation information file 83, the segmentation data 831 in which the learning flag is "1". The segmentation data 831 in which the learning flag is "1" is segmentation data in which the consent flag is "1", that is, segmentation data generated in a transaction with the purchaser who touched the [consent] button BTa on the consent confirmation screen SCa and not used for the learning of the machine learning model 82. The processor 91 further detects, among the segmentation data 831 of the learning flag, the segmentation data 831 in which the date of the segmentation start date and time or the segmentation end date and time is included in the learning period. The processor 91 performs the learning of the machine learning model 82 using a video captured by the camera 50 within the time from the segmentation start date and time until the segmentation end date and time of the segmentation data 831. The video is a video in which the purchaser who consented to utilizing the video of the camera 50 for a purpose other than the original purpose is projected.

On the other hand, the processor 91 does not detect, from the segmentation information file 83, the segmentation data 831 in which the consent flag is "0". Therefore, a video in which a purchaser who did not consent to addition video usage is not used for the learning of the machine learning data 82.

As a learning algorithm of the machine learning model 82, a well-known algorithm can be used. Therefore, detailed explanation of the learning algorithm is omitted here.

Action Effects of the Checkout System

According to an embodiment, it is possible to obtain consent of a purchaser who performs registration of a purchased commodity by himself or herself at a self-service POS terminal 10 to additional use of transaction video for a purpose other than the original purpose, without an employee of the store being required to interact with the purchaser. Moreover, it is possible to obtain this consent before the purchaser starts the registration of the purchased commodity. Therefore, it is possible to prevent any trouble with the purchaser that might occur when is attempted to obtain consent after the registration of the purchased commodity.

On the other hand, at the monitoring apparatus 60, the date and time when the selection input of consent was received by the self-service POS terminal 10 is set as the segmentation start date and time of the video captured by the camera 50 and the date and time when the checkout of the commodity ended is set as the segmentation end date and time of the video. As explained above, timing when the consent is received at the self-service POS terminal 10 is before the purchaser starts the registration of the purchased commodity. Therefore, since the period from the segmentation start time until the segmentation end time includes a period from when the purchaser starts the registration of the purchased commodity until the purchaser ends the checkout, it is possible to use video relating to first to end operation for the self-service POS terminal 10 by the purchaser whose consent was obtained in the learning of the machine learning model 82.

Second Embodiment

Subsequently, a second embodiment is explained with reference to FIGS. 11 to 15.

The second embodiment can also be applied to the checkout system 100 illustrated in FIG. 1. Aspects different from those in the first embodiment are primarily explained below. Aspects common to the first embodiment are denoted by the same reference numerals.

Explanation of the Checkout System

In the second embodiment, the monitoring apparatus 60 can access the POS server 20. For example, the monitoring apparatus 60 can access the POS server 20 via the self-service POS terminal 10. Alternatively, the monitoring apparatus 60 is connected to the communication network 40 and can access the POS server 20 not via the self-service POS terminal 10.

In the second embodiment, a data structure of a member record 221 stored in the member database 22 is different from the data structure in the first embodiment.

FIG. 11 is a schematic diagram illustrating the data structure of the member record 221. As illustrated, the member record 221 includes a member consent flag and a confirmation unnecessary flag (also referred to as an unnecessity flag) in addition to a member code and member information. The member consent flag is one-bit data for identifying whether a member identified by the member code consented to utilizing a video of the camera 50 for a purpose other than the original purpose. In this second embodiment, the member consent flag of a member who consented to the utilization is "1" and the member consent flag of a member who did not consent to the utilization is "0". The confirmation unnecessary flag is one-bit data for identifying whether a member is a member for whom confirmation about whether to consent to utilizing the video of the camera 50 for a purpose other than the original purpose is unnecessary. In this second embodiment, the confirmation unnecessary flag of a member for whom the confirmation is unnecessary is "1" and the confirmation unnecessary flag of a member for whom the confirmation is necessary is "0".

Operation Explanation of the Checkout System

Figure 12:
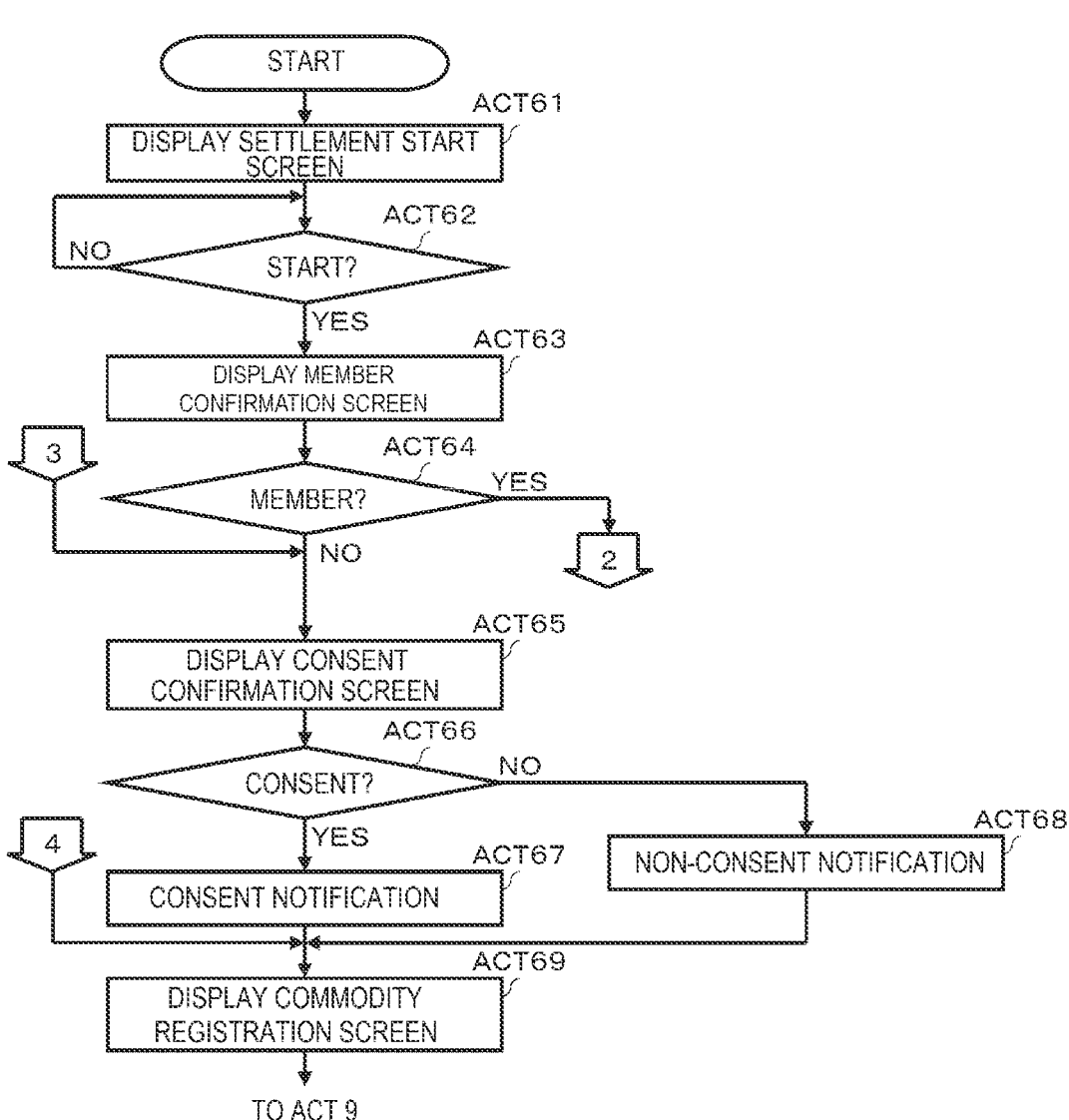
FIG. 12 is a flowchart of information processing executed by a processor of a self-service POS terminal in a second embodiment.
Figure 13:
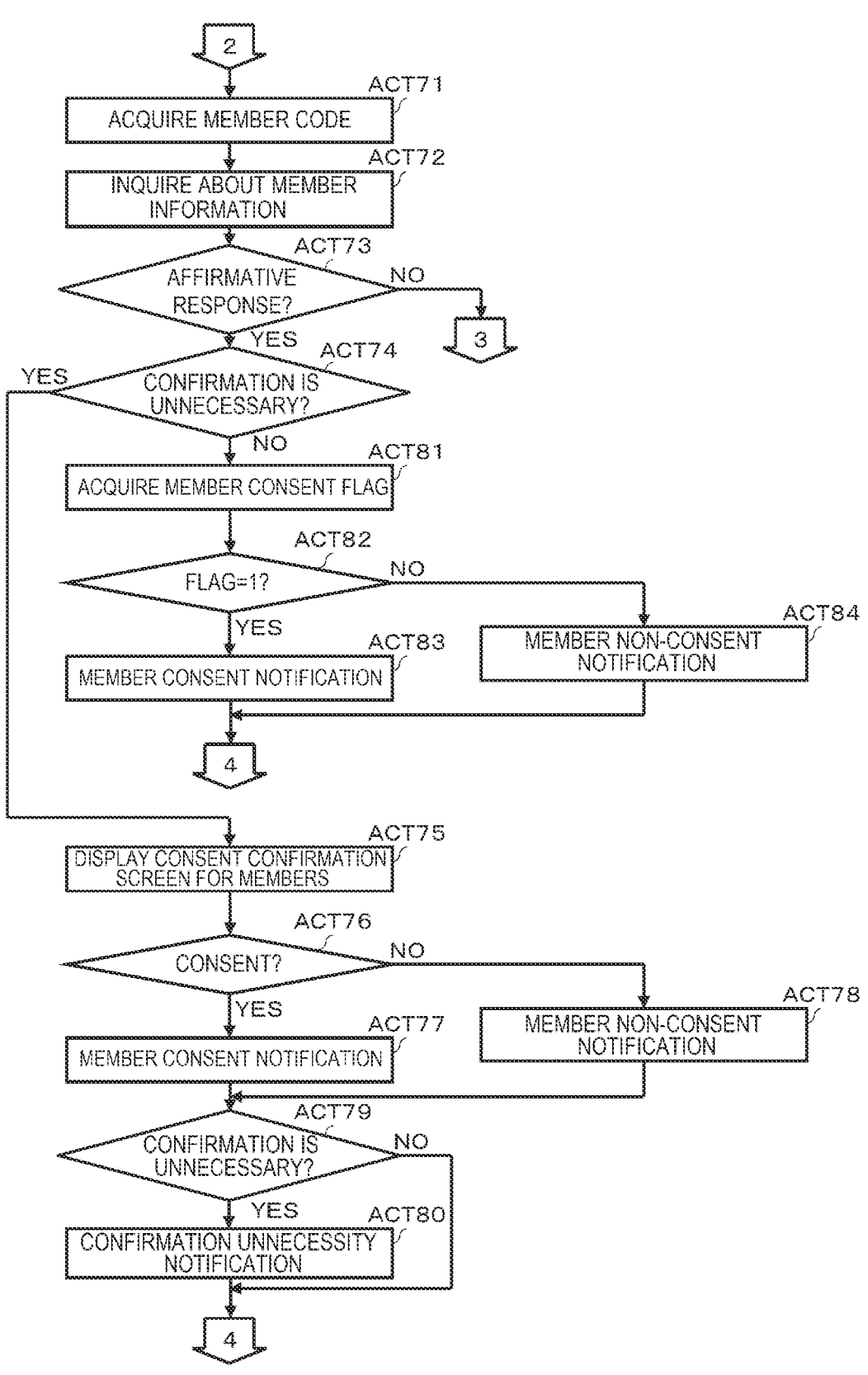
FIG. 13 is a flowchart of information processing executed by a processor of a self-service POS terminal in a second embodiment.
Figure 14:
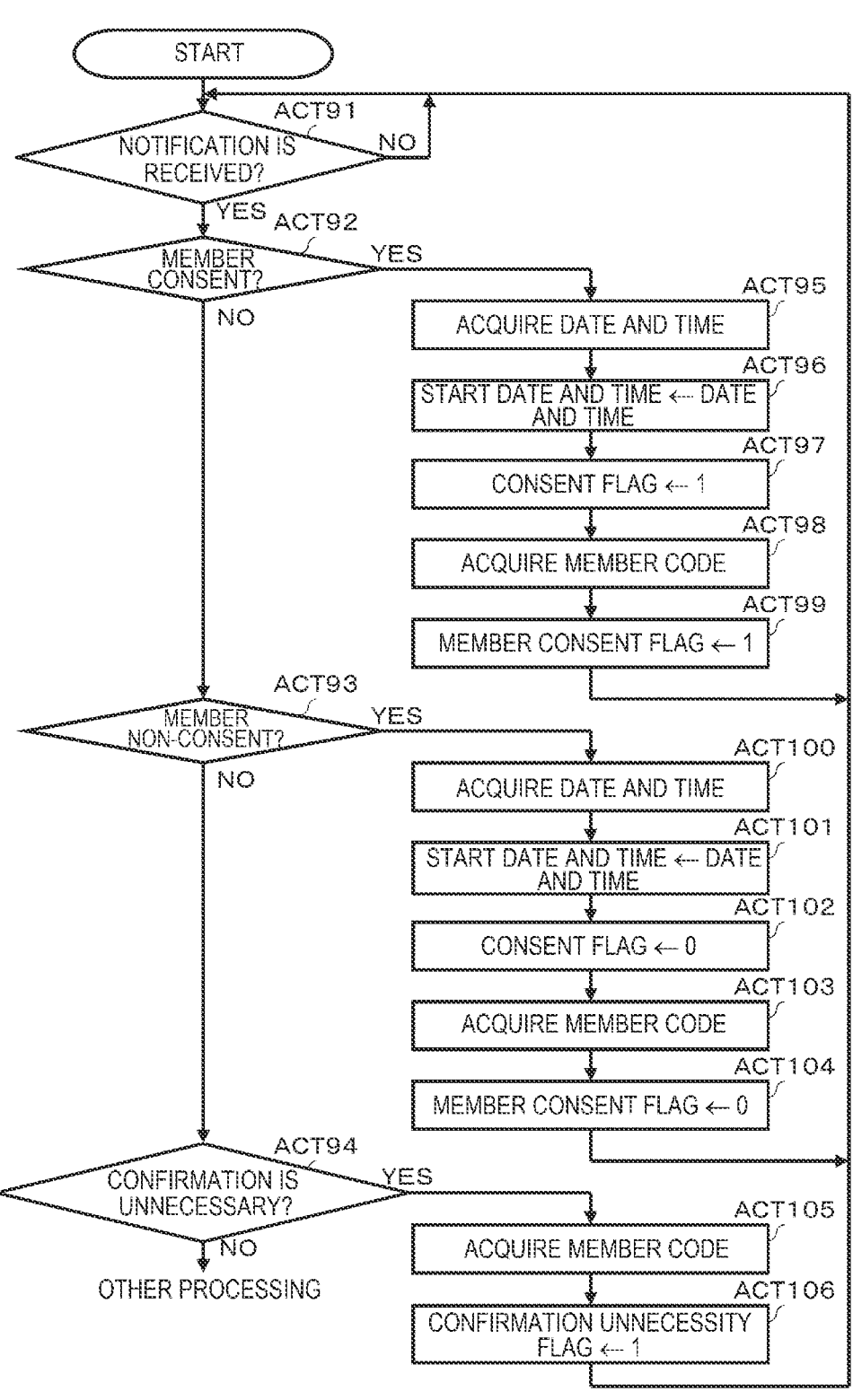
FIG. 14 is a flowchart of information processing executed by the processor of a monitoring apparatus in a second embodiment.
Figure 15:
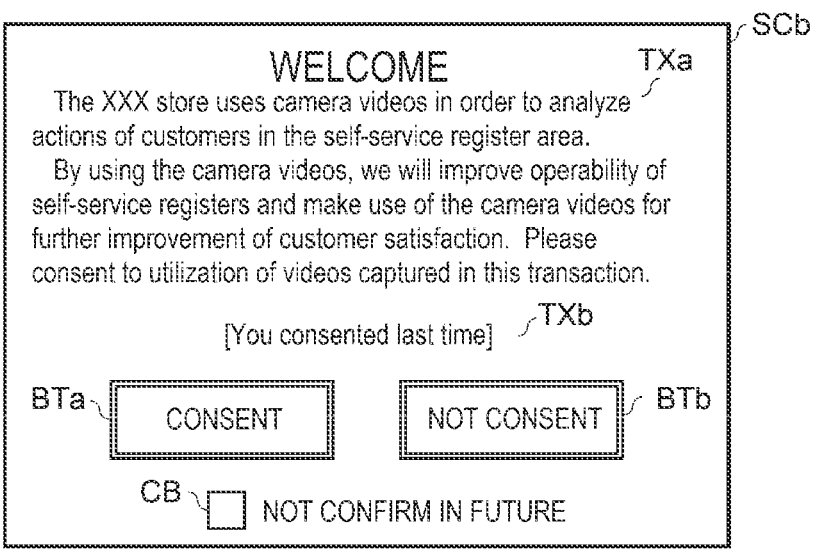
FIG. 15 is a schematic diagram illustrating a consent confirmation screen for members displayed on a touch panel of the self-service POS terminal.

FIGS. 12 and 13 are flowcharts illustrating a procedure different from the procedure in the first embodiment among the procedures of the information processing executed according to the first program by the processor 71 of the self-service POS terminal 10. FIG. 14 is a flowchart illustrating a procedure different from the procedure in the first embodiment among the procedures of the information processing executed according to the second program by the processor 91 of the monitoring apparatus 60. FIG. 15 is a schematic diagram illustrating a consent confirmation screen for members SCb displayed on the touch panel 11 of the self-service POS terminal 10. Subsequently, operations different from the operations in the first embodiment of the self-service POS terminal 10 and the monitoring apparatus 60 configuring the checkout system 100 are explained with reference to the figures. Procedures and content of information processing explained below are examples. The procedures and the contents can be changed as appropriate so long as the same results can be achieved. The consent confirmation screen for members SCb is also an example. The arrangement of display elements, content of text, and the like can be changed as appropriate.

(Operation of the Self-Service POS Terminal)

If the self-service POS terminal 10 is in an idle state in which the self-service POS terminal 10 does not receive operation by a purchaser, in ACT 61, the processor 71 causes, via the device interface 771, the touch panel 11 to display the settlement start screen. A softkey of a [start] button is disposed on the settlement start screen. If the self-service POS terminal 10 is in the idle state in this way, in the first embodiment, the processor 71 causes the touch panel 11 to display the consent confirmation screen SCa instead of the settlement start screen. However, in the second embodiment, the processor 71 causes the touch panel 11 to display the existing settlement start screen.

Therefore, the purchaser who put a purchased commodity in a shopping basket or loaded the purchased commodity on a shopping cart in the selling floor, moved to the checkout place, and stood in the front of the self-service POS terminal 10 not in use checks the settlement start screen first. The purchaser who registers the purchased commodity in the self-service POS terminal 10 touches the [start] button.

In ACT 62, the processor 71 waits for the [start] button to be touched. If the [start] button was touched and a corresponding signal was input via the device interface 771, the processor 71 proceeds from ACT 62 to ACT 63. In ACT 63, the processor 71 causes, via the device interface 771, the touch panel 11 to display a member confirmation screen. The member confirmation screen is the same as the member confirmation screen in the first embodiment. That is, a [member] button and a [non-member] button are second operation pieces. If the purchaser is a member, the purchaser touches the [member] button. If the purchaser is not a member, the purchaser touches the [non-member] button.

In ACT 64, the processor 71 waits for the [member] button to be touched or the [non-member] button to be touched. If the [non-member] button was touched and a corresponding signal was input via the device interface 771, the processor 71 proceeds from ACT 64 to ACT 65. In ACT 65, the processor 71 causes, via the device interface 771, the touch panel 11 to display the consent confirmation screen SCa. The consent confirmation screen SCa is the same as the consent confirmation screen SCa in the first embodiment. That is, a [consent] button and a [not consent] button are first operation pieces. A purchaser who consents to utilizing the video of the camera 50 for a purpose other than the original purpose touches the [consent] button. A purchaser who does not consent to utilizing the video of the camera 50 for a purpose other than the original purpose touches the [not consent] button.

In ACT 66, the processor 71 waits for the [consent] button BTa to be touched or the [not consent] button BTb to be touched. If the [consent] button BTa is touched, the processor 71 proceeds from ACT 66 to ACT 67. In ACT 67, the processor 71 transmits a consent notification signal to the monitoring apparatus 60 via the second communication interface 76.

If the [not consent] button BTb is touched, the processor 71 proceeds from ACT 66 to ACT 68. In ACT 68, the processor 71 transmits a non-consent notification signal to the monitoring apparatus 60 via the second communication interface 76.

The processor 71 then proceeds to ACT 69 after ACT 67 or ACT 68. In ACT 69, the processor 71 causes, via the device interface 771, the touch panel 11 to display a commodity registration screen. The commodity registration screen is also the same as the commodity registration screen in the first embodiment. Information processing of the processor 71 after causing the touch panel 11 to display the commodity registration screen is also the same as the information processing in the first embodiment. Therefore, the processing in ACT 9 to ACT 15 in FIG. 7 can be directly applied to the second embodiment and repeated explanation of the processing is omitted.

On the other hand, if the [member] button was touched on the member confirmation screen and a signal corresponding thereto was input via the device interface 771, the processor 71 proceeds from ACT 64 to ACT 71 in FIG. 13. In ACT 71, the processor 71 reads data of a member card from the card reader 12 via the device interface 772. The processor 71 detects a member code from the data of the member card. Alternatively, the processor 71 acquires, via the device interface 774 or the device interface 775, data of a barcode or a two-dimensional code read by the scanner 14 or the hand scanner 15. The processor 71 detects a member code from the data of the barcode or the two-dimensional code.

The processor 71 that acquired the member code in this way next proceeds to ACT 72. In ACT 72, the processor 71 accesses the POS server 20 and sends a query (inquiry) to the POS server 20 about the member code. In response to the inquiry, the POS server 20 searches through the member database 22. If successfully detecting a member record 221 including the member code, the POS server 20 transmits an affirmative response signal including data of the member record 221 to the self-service POS terminal 10. If not successfully detecting the member record 221 including the member code, the POS server 20 transmits a negative response signal to the self-service POS terminal 10.

In ACT 73, the processor 71 checks the response signal transmitted from the POS server 20. Upon receiving the negative response signal, the processor 71 proceeds to ACT 65 in FIG. 12. That is, the processor 71 causes the touch panel 11 to display the consent confirmation screen SCa. Thereafter, the processor 71 executes the processing in ACT 65 and subsequent acts in the same manner as explained above.

Upon receiving the affirmative response signal, the processor 71 checks a confirmation unnecessary flag of member data included in the affirmative response signal in ACT 74. If the confirmation unnecessary flag is a value indicating that a member is a member for whom confirmation is necessary, that is, "0", the processor 71 proceeds from ACT 74 to ACT 75. In ACT 75, the processor 71 causes, via the device interface 771, the touch panel 11 to display the consent confirmation screen for members SCb.

As illustrated in FIG. 15, first text TXa and second text TXb for obtaining consent of a purchaser for utilizing video of the transaction from the camera 50 are displayed on the consent confirmation screen for members SCb. Softkeys of the [consent] button BTa and the [not consent] button BTb are disposed. The [consent] button BTa and the [not consent] button BTb are first operation pieces for receiving selection input of consent and non-consent. Further, a checkbox CB for checking if a selection result of the [consent] button BTa and the [not consent] button BTb are stored is disposed. The checkbox CB is a third operation piece for instructing to store a result of the selection input of the consent or the non-consent. If the member consent flag of the member record 221 is a value "1" (indicating consent), the second text TXb is, for example, text "You consented last time". If the member consent flag is not the value "1" (indicating consent), the second text TXb is, for example, content "Please consent". The second text TXb may be omitted in some examples.

The purchaser touches the [consent] button BTa if the purchaser consents to use of the video of the camera 50 for a purpose other than the original purpose. The purchaser touches the [not consent] button BTb if the purchaser does not consent to use of the video of the camera 50 for a purpose other than the original purpose (present transaction monitoring). The purchaser checks the checkbox CB if the purchaser stores a selection result of this time.

In ACT 76, the processor 71 waits for the [consent] button BTa or the [not consent] button BTb to be touched. If the [consent] button BTa is touched and a corresponding signal input via the device interface 771, the processor 71 proceeds from ACT 76 to ACT 77. In ACT 77, the processor 71 transmits a member consent notification signal to the monitoring apparatus 60 via the second communication interface 76. The member consent notification signal includes a member code.

If the [not consent] button BTb is touched and a corresponding signal input via the device interface 771, the processor 71 proceeds from ACT 76 to ACT 78. In ACT 78, the processor 71 transmits a member non-consent notification signal to the monitoring apparatus 60 via the second communication interface 76. The member non-consent notification signal also includes a member code.

After ACT 77 or ACT 78, processor 71 proceeds to ACT 79. In ACT 79, the processor 71 checks whether the checkbox CB is checked. If the checkbox CB is checked, the processor 71 proceeds from ACT 79 to ACT 80. In ACT 80, the processor 71 transmits a confirmation unnecessary notification signal to the monitoring apparatus 60 via the second communication interface 76. If the checkbox CB is not checked, the processor 71 skips the processing in ACT 80. The confirmation unnecessary notification signal also includes a member code.

After executing or skipping ACT 80, the processor 71 proceeds to ACT 69 in FIG. 12. That is, the processor 71 causes the touch panel 11 to display the commodity registration screen. Thereafter, the processor 71 executes the processing in ACT 69 and subsequent acts in the same manner as explained above.

On the other hand, if the confirmation unnecessary flag of the member data included in the affirmative response signal is a value indicating that a member is a member for whom confirmation is unnecessary, that is, "1", the processor 71 proceeds from ACT 74 to ACT 81. In ACT 81, the processor 71 acquires a member consent flag of the member data included in the affirmative response signal. In ACT 82, the processor 71 checks whether the member consent flag is "1". If the member consent flag is "1", the processor 71 proceeds from ACT 82 to ACT 83. In ACT 83, the processor 71 transmits a member consent notification signal to the monitoring apparatus 60 via the second communication interface 76.

If the member consent flag is "0", the processor 71 proceeds from ACT 82 to ACT 84. In ACT 84, the processor 71 transmits a member non-consent notification signal to the monitoring apparatus 60 via the second communication interface 76.

After ACT 83 or ACT 84, the processor 71 proceeds to ACT 69 in FIG. 12. That is, the processor 71 causes the touch panel 11 to display the commodity registration screen. Thereafter, the processor 71 executes the processing in ACT 69 and subsequent acts in the same manner as explained above.

(Operation of the Monitoring Apparatus)

As explained above, the types of the notification signals transmitted from the self-service POS terminal 10 to the monitoring apparatus 60 include the member consent notification signal, the member non-consent notification signal, and the confirmation unnecessary notification signal in addition to the consent notification signal, the non-consent notification signal, and the use end notification signal.

In ACT 91 in FIG. 14, the processor 91 of the monitoring apparatus 60 waits for a notification signal from the self-service POS terminal 10. Upon receiving a notification signal via the first terminal interface 97, the processor 91 proceeds from ACT 91 to ACT 92. In ACT 92, the processor 91 checks whether the member consent notification signal was received. If the notification signal is not the member consent notification signal, the processor 91 proceeds from ACT 92 to ACT 93. In ACT 93, the processor 91 checks whether the member non-consent notification signal was received. If the notification signal is not the member non-consent notification signal, the processor 91 proceeds from ACT 93 to ACT 94. In ACT 94, the processor 91 checks whether the confirmation unnecessary notification signal was received.

If the notification signal is not the confirmation unnecessary notification signal, the processor 91 executes other processing. For example, if the notification signal is the consent notification signal, the non-consent notification signal, or the use end notification signal, the processor 91 executes the same processing as the processing in ACT 25 to ACT 36 explained in the first embodiment.

If the notification signal is the member consent notification signal, the processor 91 proceeds from ACT 92 to ACT 95. In ACT 95, the processor 91 acquires a present date and time tracked by the timepiece 94. In ACT 96, the processor 91 sets the date and time as a segmentation start date and time. In ACT 97, the processor 91 sets the consent flag to "1".

Subsequently, in ACT 98, the processor 91 acquires a member code from the member consent notification signal. In ACT 99, the processor 91 accesses the POS server 20 and instructs the POS server 20 to set the member consent flag of the member record 221 including the member code to a value "1" indicating consent. In response to the instruction, the POS server 20 sets the member consent flag of the member record 221 including the member code among member records 221 stored in the member database 22 to "1". After finishing the processing explained above, the processor 91 returns to ACT 91 and waits for the next notification signal to be received.

If the notification signal is the member non-consent notification signal, the processor 91 proceeds from ACT 93 to ACT 100. In ACT 100, the processor 91 acquires a present date and time tracked by the timepiece 94. In ACT 101, the processor 91 sets the date and time as a segmentation start date and time. In ACT 102, the processor 91 sets the consent flag to "0".

Subsequently, in ACT 103, the processor 91 acquires a member code from the member non-consent notification signal. In ACT 104, the processor 91 accesses the POS server 20 and instructs the POS server 20 to set the member consent flag of the member record 221 including the member code to a value "0" indicating non-consent. In response to the instruction, the POS server 20 sets the member consent flag of the member record 221 including the member code among the member records 221 stored in the member database 22 to "0". Upon finishing the processing explained above, the processor 91 returns to ACT 91 and waits for the next notification signal to be received.

If the notification signal is the confirmation unnecessary notification signal, the processor 91 proceeds from ACT 94 to ACT 105. In ACT 105, the processor 91 accesses the POS server 20 and instructs the POS server 20 to set the confirmation unnecessary flag of the member record 221 including the member code to a value "1" indicating a member for whom confirmation is unnecessary. In response to the instruction, the POS server 20 sets the confirmation unnecessary flag of the member record 221 including the member code among the member records 221 stored in the member database 22 to "1". Upon finishing the processing explained above, the processor 91 returns to ACT 91 and waits for the next notification signal to be received.

As explained above, if the purchaser who is the member for whom the confirmation unnecessary flag is "0", that is, the confirmation about whether to consent is necessary touches the [start] button of the settlement start screen of the self-service POS terminal 10 and subsequently touches the [member] button of the member confirmation screen, the consent confirmation screen for members SCb is displayed. If the purchaser touches, for example, the [not consent] button BTb and further checks the checkbox CB, in the monitoring apparatus 60, the present date and time reaches the use start date and time and the consent flag changes to "0". In the POS server 20, the member consent flag of the member record 221 including the member code of the member in the member database 22 changes to "0". The confirmation unnecessary flag changes to "1". Thereafter, if the checkout of the purchaser ends and the use end notification signal is output from the self-service OS terminal 10 to the monitoring apparatus 60, the present date and time reaches the use end date and time. Since the consent flag is "0", the learning flag changes to "0". Therefore, a video obtained by imaging the purchaser is not used for the learning of the machine learning model.

Thereafter, if the purchaser touches the [start] button of the settlement start screen of the self-service POS terminal 10 again and subsequently touches the [member] button of the member confirmation screen, the consent confirmation screen for members SCb is not displayed. The commodity registration screen is displayed on the touch panel 11. The consent flag of the monitoring apparatus 60 changes to "0". Therefore, the video obtained by imaging the purchaser is not used for the learning of the machine learning model.

The purchaser, who is the member, touches the [not consent] button of the consent confirmation screen for members SCb and checks the checkbox CB in this way, whereby operation for the consent confirmation screen for members SCb is unnecessary thereafter. The image obtained by imaging the purchaser is not used for the learning of the machine learning model.

On the other hand, if the purchaser who checked the consent confirmation screen for members SCb touches, for example, the [consent] button BTa and further checks the checkbox CB, in the monitoring apparatus 60, the present date and time reaches the use start date and time and the consent flag changes to "1". In the POS server 20, the member consent flag of the member record 221 including a member code of the member in the member database 22 changes to "1". The confirmation unnecessary flag also changes to "1". Thereafter, if the checkout of the purchaser ends and the use end notification signal is output from the self-service POS terminal 10 to the monitoring apparatus 60, the present date and time reaches the use end date and time. Since the consent flag is "1", the learning flag changes to "1". Therefore, the video obtained by imaging the purchaser is used for the learning of the machine learning model.

Thereafter, if the purchaser touches the [start] button of the settlement start screen of the self-service POS terminal 10 again and subsequently touches the [member] button of the member confirmation screen, the consent confirmation screen for members SCb is not displayed. The commodity registration screen is displayed on the touch panel 11. The consent flag of the monitoring apparatus 60 changes to "1". Therefore, the video obtained by imaging the purchaser is used for the learning of the machine learning model.

The purchaser, who is the member, touches the [consent] button of the consent confirmation screen for members SCb and checks the checkbox CB in this way, whereby operation for the consent confirmation screen for members SCb is unnecessary thereafter. The image obtained by imaging the purchaser is used for the learning of the machine learning model.

Other Embodiments

In certain embodiments, a camera 50 and a monitoring apparatus 60 are separately provided for each of the self-service POS terminals 10. As another embodiment, a camera 50 and a monitoring apparatus 60 may be shared by two self-service POS terminals 10 adjacent to each other. Alternatively, in some examples, one monitoring apparatus 60 may be connected to a plurality of cameras 50 to monitor fraudulent acts of purchasers at two or more self-service POS terminals 10.

In an embodiment, upon receiving the non-consent notification signal from the self-service POS terminal 10, the processor 91 executes the processing in ACT 28 to ACT 30. As another embodiment, the processor 91 may only have to omit the processing in ACT 28 and ACT 29, proceed from ACT 23 to ACT 30, and set the consent flag to "1". In this case, the segmentation data 831 stored in ACT 36 is data for which a segmentation start date and time is not set. Further, the segmentation data 831 in which a segmentation start date and time is not set may not be stored in the segmentation information file 83. Consequently, there is an advantage that a storage capacity of the segmentation information file 83 can be saved.

Besides, while the several embodiments are explained above, these embodiments are presented as examples and are not intended to limit the scope of invention. These new embodiments can be implemented in other various forms. Various omissions, substitutions, and changes can be made in a range not departing from the gist of the invention. These embodiments and modifications thereof are included in the scope and the gist of the invention and included in the inventions described in the claims and a scope of equivalents of the inventions.

What is claimed is:

1. A video-monitored commodity registration apparatus, comprising:
   an input device that can be operated by a customer himself or herself to input information related to a sales transaction in which the customer purchases a commodity;
   a display device configured to display information to the customer who operates the input device; and
   a processor configured to:
      cause the display device to display a consent confirmation screen for obtaining consent from the customer for an additional use of a video from a camera monitoring the customer during the sales transaction beyond monitoring of the customer during the sales transaction; and
      perform registration processing for the commodity to be purchased by the customer based on information from the input device, wherein
   the consent confirmation screen is displayed before the processor performs the registration processing,
   the consent conformation screen supplies notice to the customer of video monitoring of the sales transaction which is a use for which explicit customer consent is not required, and
   the additional use of the video is collection of training data for a machine-learning model for monitoring registration processing.

2. The video-monitored commodity registration apparatus according to claim 1, wherein the consent confirmation screen is a screen with a first operation element for receiving a selection of consent or non-consent from the customer.

3. The video-monitored commodity registration apparatus according to claim 2, wherein the selection of consent or non-consent received via the first operation element serves as an operation start declaration for the registration processing.

4. The video-monitored commodity registration apparatus according to claim 3, wherein the consent confirmation screen has a second operation element for receiving a selection of a member or non-member status from the customer.

5. The video-monitored commodity registration apparatus according to claim 1, wherein the processor is further configured to:

cause the display device to display a member confirmation screen to receive a selection of a member or non-member status from the customer.

6. The video-monitored commodity registration apparatus according to claim 5, wherein the member confirmation screen is displayed after the consent confirmation screen.

7. The video-monitored commodity registration apparatus according to claim 5, wherein the member confirmation screen is displayed before the consent confirmation screen.

8. The video-monitored commodity registration apparatus according to claim 7, wherein the consent confirmation screen has a third operation element for instructing storage of the selection of consent or non-consent in association with a member identification provided in association with the member confirmation screen.

9. The video-monitored commodity registration apparatus according to claim 8, wherein the processor is further configured to:

check a stored selection of consent or non-consent associated with a member identification provided in association with the member confirmation screen and skip the displaying of the consent confirmation screen if the stored selection of consent or non-consent is associated with the member identification.

10. A machine learning data collection system for retail sales transaction monitoring, the system comprising:

a video-monitored commodity registration apparatus according to claim 1; and a monitoring apparatus connected to the video-monitored commodity registration apparatus and configured to store the video of from the camera monitoring the customer during the sales transaction in association with an indication of the consent from the customer for the additional use of the video from the camera.

\* \* \* \* \*